US008854540B2

(12) United States Patent
Yamashita

(10) Patent No.: US 8,854,540 B2
(45) Date of Patent: Oct. 7, 2014

(54) SIGNAL TRANSMISSION APPARATUS, SIGNAL TRANSMISSION METHOD, SIGNAL RECEPTION APPARATUS, SIGNAL RECEPTION METHOD, AND SIGNAL TRANSMISSION SYSTEM

(75) Inventor: Shigeyuki Yamashita, Kanagawa (JP)

(73) Assignee: Sony Corporation, Tokyo (JP)

(*) Notice: Subject to any disclaimer, the term of this patent is extended or adjusted under 35 U.S.C. 154(b) by 327 days.

(21) Appl. No.: 13/473,767

(22) Filed: May 17, 2012

(65) Prior Publication Data

US 2012/0300124 A1    Nov. 29, 2012

(30) Foreign Application Priority Data

May 26, 2011    (JP) .................................. 2011-117707

(51) Int. Cl.
| H04N 7/01 | (2006.01) |
| H04N 21/236 | (2011.01) |
| H04N 21/2365 | (2011.01) |
| H04N 5/232 | (2006.01) |
| H04N 21/4223 | (2011.01) |
| H04N 5/225 | (2006.01) |

(52) U.S. Cl.
CPC .......... *H04N 7/0125* (2013.01); *H04N 5/23203* (2013.01); *H04N 21/23602* (2013.01); *H04N 21/4223* (2013.01); *H04N 5/225* (2013.01); *H04N 21/2365* (2013.01); *H04N 7/01* (2013.01)
USPC ........... 348/441; 348/443; 348/445; 348/446; 348/423.1; 348/521; 348/525; 375/354; 375/365; 375/366

(58) Field of Classification Search
CPC ..... H04N 5/225; H04N 5/23203; H04N 7/01; H04N 7/0125; H04N 21/23602; H04N 21/2365; H04N 21/4223

USPC .............. 348/441, 443, 445, 446, 423.1, 521, 348/525; 375/354, 365, 366
See application file for complete search history.

(56) References Cited

U.S. PATENT DOCUMENTS

| 6,847,692 B2* | 1/2005 | Tokuhiro ....................... 375/354 |
| 7,583,708 B2* | 9/2009 | Yamashita .................... 370/535 |
| 8,289,445 B2* | 10/2012 | Yamashita .................... 348/441 |

FOREIGN PATENT DOCUMENTS

JP    2005-328494    11/2005

OTHER PUBLICATIONS

Yamashita. JP 2005-328494 Translation. Nov. 2005.*

*Primary Examiner* — Christopher S Kelley
*Assistant Examiner* — Zhihan Zhou
(74) *Attorney, Agent, or Firm* — Frommer Lawrence & Haug LLP; William S. Frommer; Ellen Marcie Emas

(57) ABSTRACT

A signal transmission apparatus includes: a vertical rectangular region sampling-out control section that obtains vertical rectangular regions, repeatedly performs a process where pixel samples read out from each line of class images are mapped to each line of video data regions of sub-images, maps pixel samples to each line of the video data regions, and repeatedly maps pixel samples to the next line; a line sampling-out control section that samples out the pixel samples every other line from each line of the sub-images to which the pixel samples have been mapped, so as to generate an interlace signal; a word sampling-out control section that samples out for each word the pixel samples which have been sampled out for each line so as to be mapped to video data regions of an HD-SDI prescribed by the SMPTE 435-2; and a readout control section that outputs the HD-SDI.

15 Claims, 19 Drawing Sheets

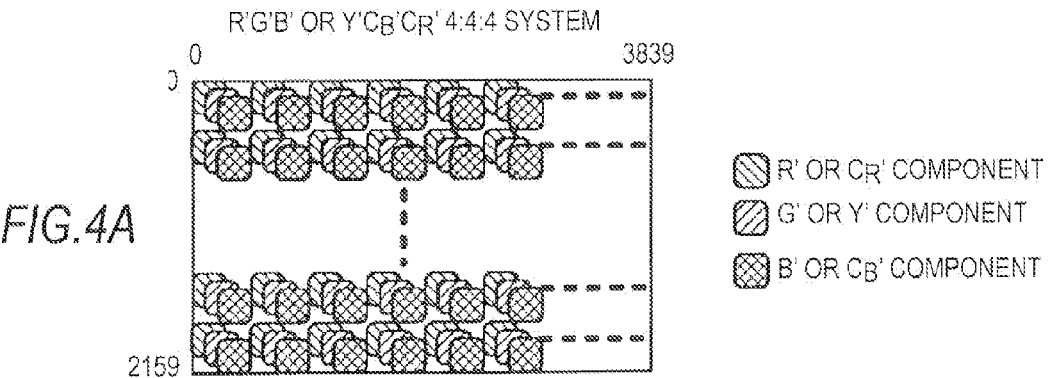
FIG.4A
R'G'B' OR Y'C$_B$'C$_R$' 4:4:4 SYSTEM
▨ R' OR C$_R$' COMPONENT
▨ G' OR Y' COMPONENT
▨ B' OR C$_B$' COMPONENT
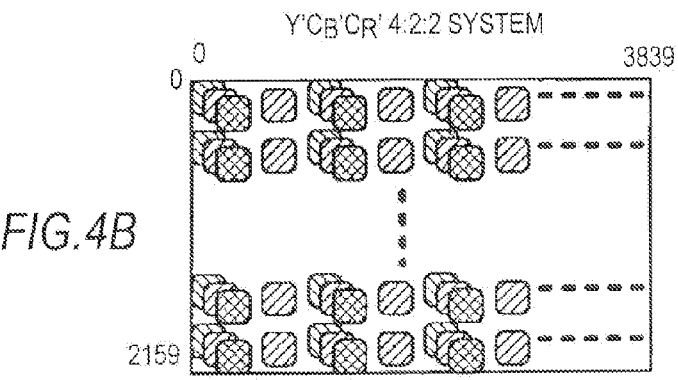
FIG.4B
Y'C$_B$'C$_R$' 4:2:2 SYSTEM
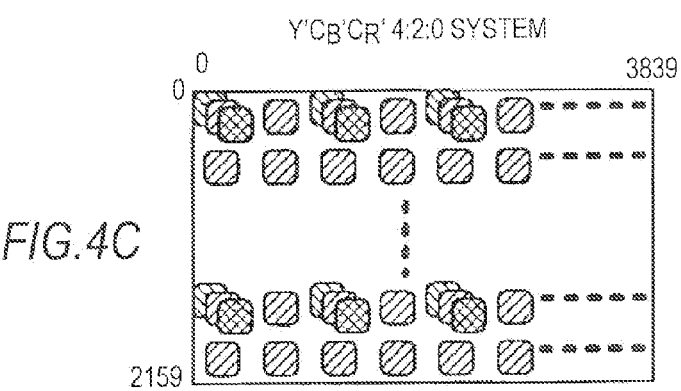
FIG.4C
Y'C$_B$'C$_R$' 4:2:0 SYSTEM
FIG.5
STRUCTURE FOR ONE LINE OF SERIAL DATA OF 10.692 Gbps
396000 BITS/LINE
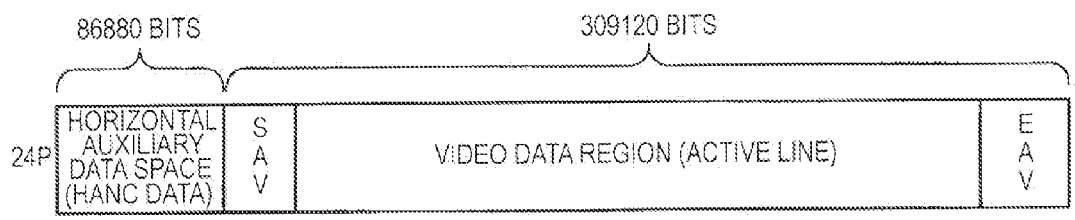

EXAMPLE OF MODE D

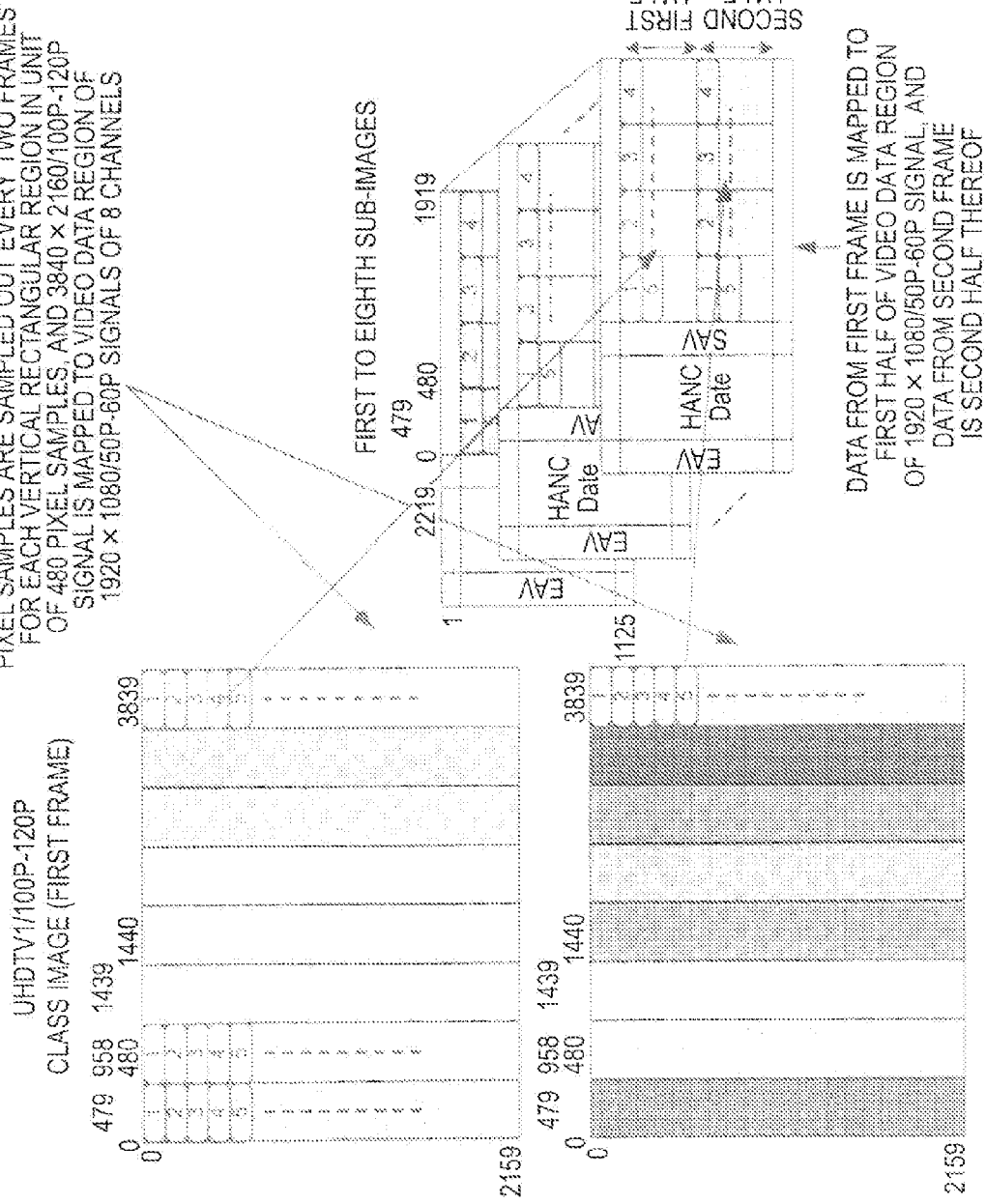

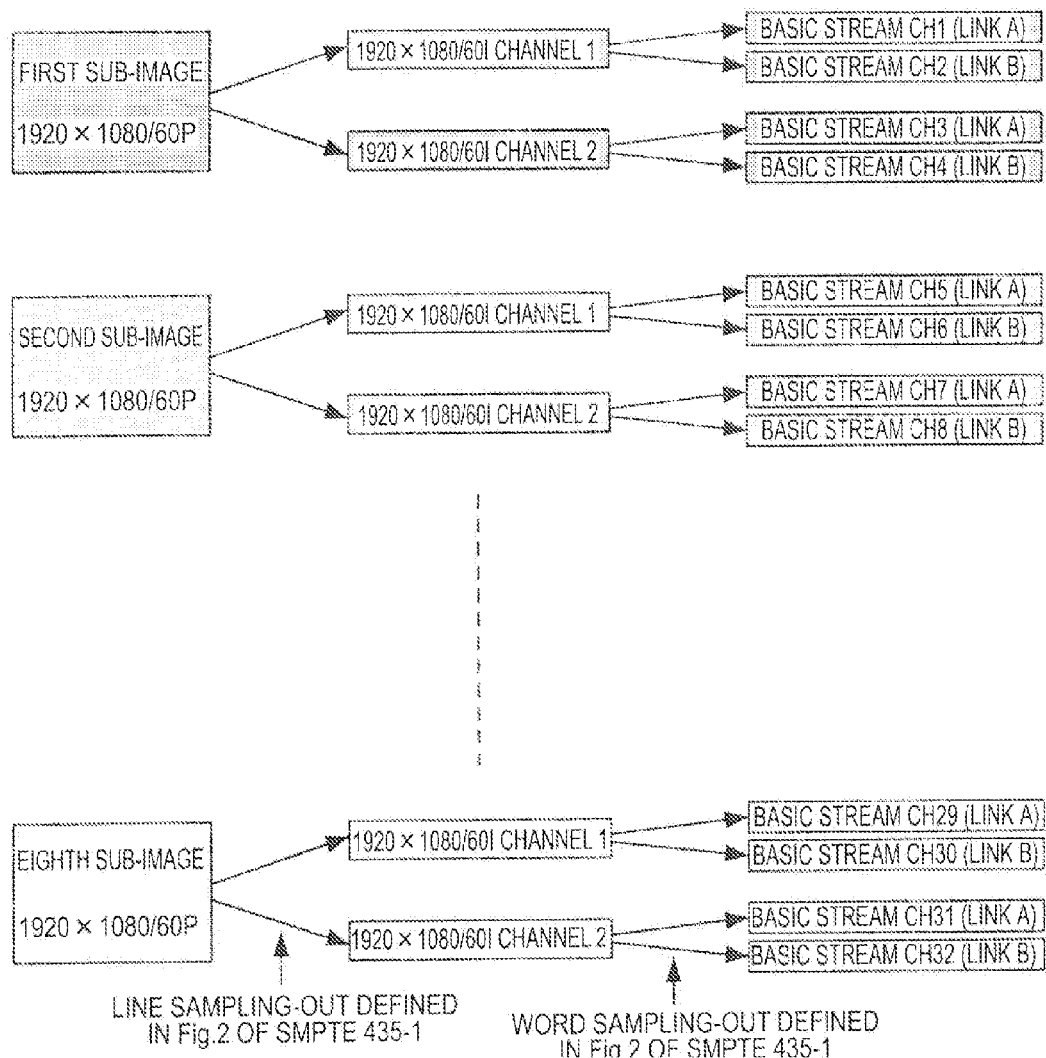

R'G'B'An:0

FIG.11A
FIG.11B
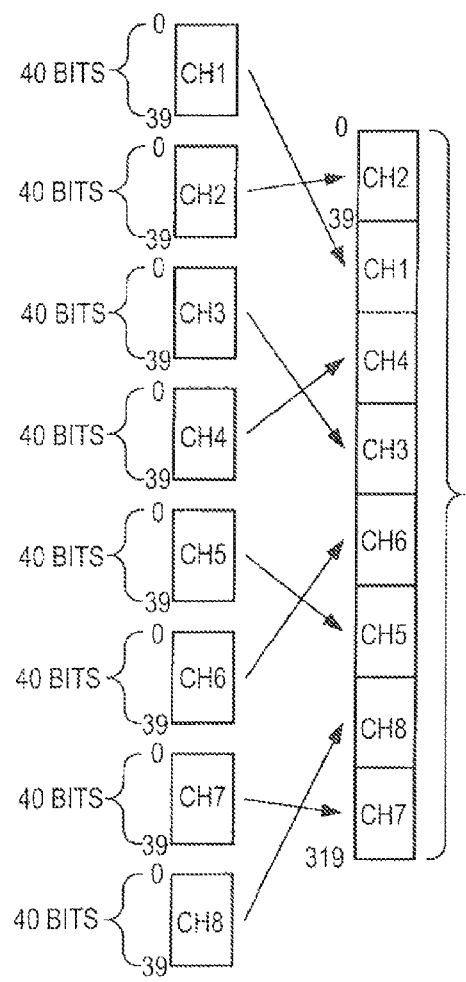
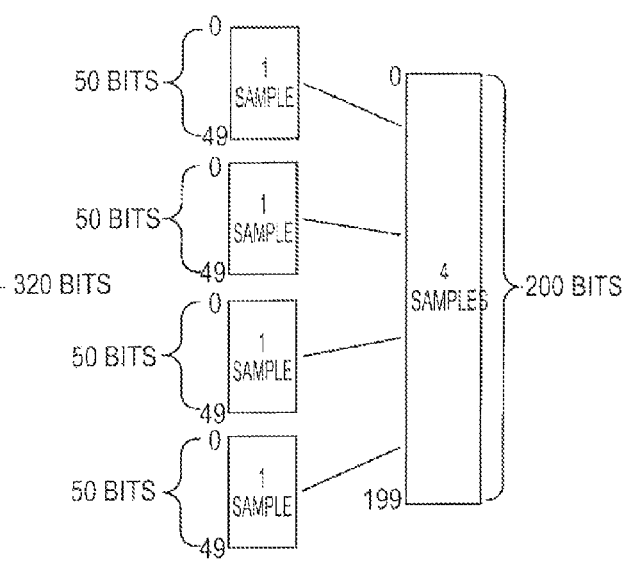

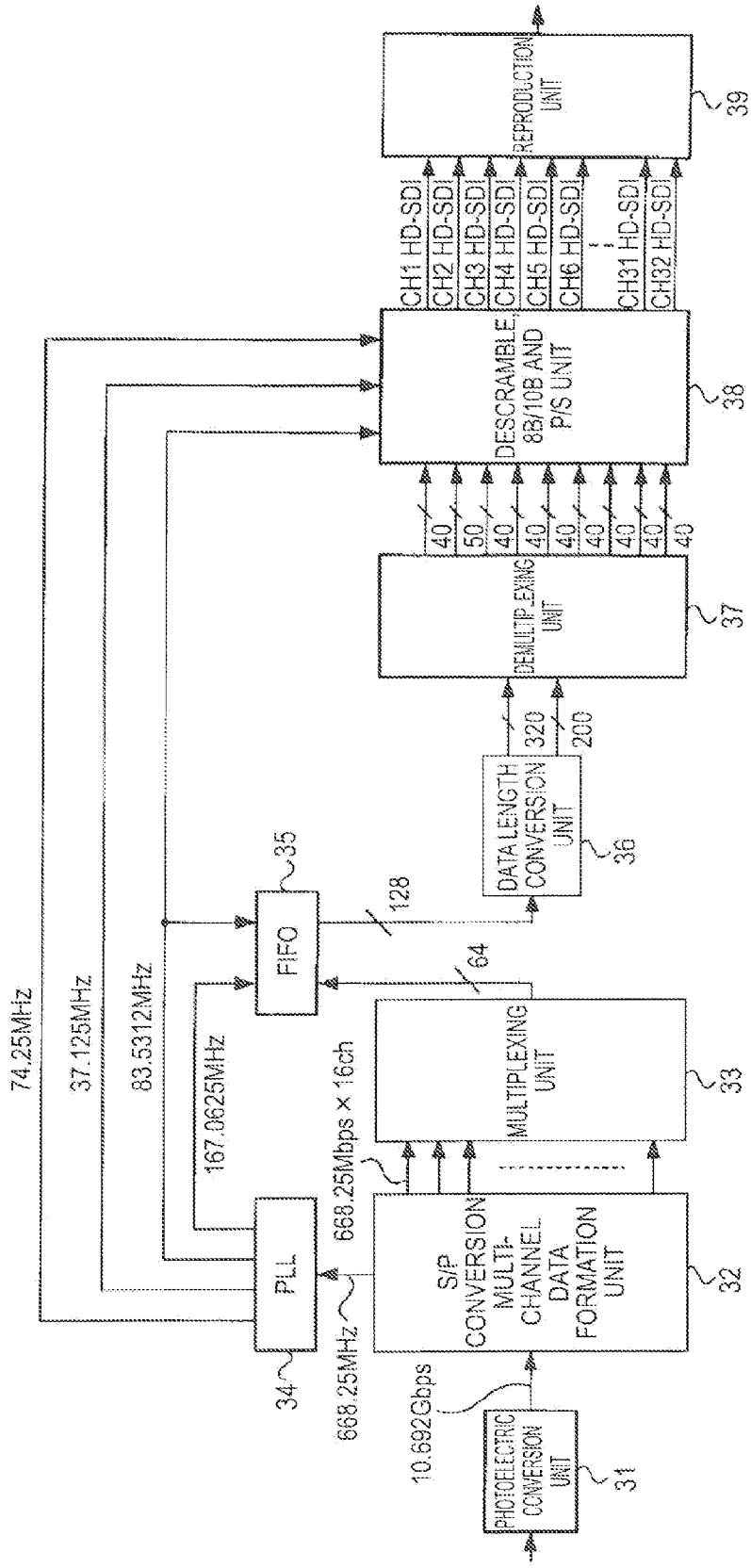

EXAMPLE OF MODE B

SIGNAL TRANSMISSION APPARATUS, SIGNAL TRANSMISSION METHOD, SIGNAL RECEPTION APPARATUS, SIGNAL RECEPTION METHOD, AND SIGNAL TRANSMISSION SYSTEM

FIELD

The present disclosure relates to a signal transmission apparatus, a signal transmission method, a signal reception apparatus, a signal reception method, and a signal transmission system which can be suitably applied to a case in which an image signal where the number of pixels of one frame exceeds the number of pixels prescribed by the HD-SDI format is serially transmitted.

BACKGROUND

In the related art, development of a reception system or an imaging system for a very high definition video signal which exceeds an existing high definition (HD) video signal which is a video signal where one frame has 1920 samples×1080 lines is proceeding. For example, a UHDTV (Ultra High Definition TV) standard which is a broadcasting system of a next generation having the number of pixels equal to four times or 16 times that of the existing HD is being standardized by international associations. The international associations include the ITU (International Telecommunication Union) and the SMPTE (Society of Motion Picture and Television Engineers).

Here, JP-A-2005-328494 discloses a technique for transmitting a 3840×2160/30P, 30/1.001P/4:4:4/12-bit signal, which is a kind of a 4 k×2 k signal (a very high resolution signal of 4 k×2 k) at a bit rate equal to or higher than 10 Gbps. In addition, a video signal indicated by m samples×n lines is abbreviated to "m×n". Further, the term "3840×2160/30P" indicates "the number of pixels in the horizontal direction"× "the number of lines in the vertical direction"/"the number of frames per second". In addition, "4:4:4" indicates the ratio of a "red signal R:green signal G:blue signal B" in the case of the primary color signal transmission method, and indicates the ratio of a "luminance signal Y:first color difference signal Cb:second color difference signal Cr" in the case of the color difference signal transmission method.

In the following description, 50P, 59.94P, 60P indicating frame rates of the progressive signal are abbreviated to "50P-60P", and 47.95P, 48P, 50P, 59.94P, 60P are abbreviated to "48P-60P". In addition, 100P, 119.88P, 120P are abbreviated to "100P-120P", and 95.9P, 96P, 100P, 119.88P, 120P are abbreviated to "96P-120P". Further, 50I, 59.94I, and 60I indicating frame rates of the interlace signal are abbreviated to "50I to 60I", and 47.95I, 48I, 50I, 59.94I, and 60I are abbreviated to "48I to 60I". In addition, a 3840×2160/100P-120P/4:4:4, 4:2:2, 4:2:0/10-bit, 12-bit signal is abbreviated to a "3840×2160/100P-120P signal" in some cases. Further, pixel samples whose number is n are abbreviated to "n pixel samples".

SUMMARY

In recent years, a video signal standard or an interface standard for 3840×2160 or 7680×4320 where the frame rate is 23.98P-60P has been standardized by the SMPTE or the ITU. In a case of using the mode D (refer to FIG. 6 described later) in order to transmit video data, a video signal of 3840×2160/23.98P-30P can be transmitted with a 10G-SDI of one channel. However, no discussion or standardization has been made with regard to a compatible interface for transmitting a video signal having a frame rate equal to or higher than 120P. In addition, since the video signal standard compatible with 1920×1080 or 2048×1080 only prescribes a frame rate of 60P, a large number of pixel samples may not be transmitted with the existing interface even if the technique disclosed in JP-A-2005-328494 is used.

Further, a video signal standard for up to 4096×2160/23.98P-60P is standardized by the SMPTE, but no discussion or standardization has been made with regard to interfaces provided in a signal transmission apparatus or a signal reception apparatus. For this reason, assuming a video signal of 4096×2160/23.98P to 30P, the number of pixel samples stored in a video data region is increased, and thus pixel samples may not be transmitted through multiplexing in the line structure of the mode D.

In a case where a video signal has 4096×2160, a frame rate is prescribed in a range of 23.98P, 24P, 25P, 29.97P, 30P, 47.95P, 48P, 50P, 59.94 P, 60P. However, it is to be considered to transmit a video signal having a frame rate of 90P equal to three times the frame rate (for example, 30P) which is currently used, or a frame rate of 90P or higher in the future. For this reason, it is necessary to establish standards for transmitting video signals having various frame rates by the use of the existing transmission interface.

Therefore, it is desirable to serially transmit a video signal where one frame has the number of pixels exceeding the number of pixels prescribed by the HD-SDI format and which has a high frame rate using the HD-SDI interface or a serial interface of 10 Gbps.

An embodiment of the present disclosure relates to transmitting a signal prescribed by an m×n (where m and n indicating m samples and n lines are positive integers)/a–b (where a and b are frame rates of a progressive signal)/r:g:b (where r, g, and b are signal ratios in a case of a predetermined signal transmission method)/10-bit, 12-bit signal having the number of pixels of one frame exceeding the number of pixels prescribed by the HD-SDI format.

Here, the following processes are performed in a case of mapping pixel samples sampled out from the consecutive first and second class images to video data regions of first to t-th (where t is an integer equal to or more than 8) sub-images prescribed by an m'×n' (m' and n' indicating m' samples and n' lines are positive integers)/a'–b' (a' and b' are frame rates of a progressive signal)/r':g':b' (r', g', and b' are signal ratios in a case of a predetermined signal transmission method)/10-bit, 12-bit signal.

Initially, first to t-th vertical rectangular regions are obtained by dividing first and second class images into t by p (where p is an integer equal to or more than 1) pixel samples in the horizontal direction.

Next, a process where pixel samples read out from each line of a 0th line to a (n−1)-th line of the first and second class images are mapped to each line of video data regions of first to t-th sub-images in a unit of p pixel samples in the horizontal direction for each of the first to t-th vertical rectangular regions, is repeatedly performed in an order of the first class image and the second class image.

In addition, pixel samples are mapped to each line of the video data regions of the first to t-th sub-images in a unit of p pixel samples m'/p times, and pixel samples are repeatedly mapped, in a unit of p pixel samples, to the next line which is vertically subsequent to the line to which the pixel samples have been mapped.

In addition, the pixel samples are sampled out every other line from each line of the first to t-th sub-images to which the pixel samples have been mapped, so as to generate an interlace signal, the pixel samples which have been sampled out for each line are sampled out for each word so as to be mapped to video data regions of an HD-SDI prescribed by the SMPTE 435-2, and the HD-SDI is output.

In one embodiment of the present disclosure, an HD-SDI is stored in a storage section, and word multiplexing is performed for pixel samples extracted from video data regions of the HD-SDI read out from the storage section, for each line.

Next, the pixel samples obtained by the word multiplexing are multiplexed into first to t-th sub-images prescribed by an m'×n' (m' and n' indicating m' samples and n' lines are positive integers)/a'–b' (a' and b' are frame rates of a progressive signal)/r':g':b' (r', g', and b' are signal ratios in a case of a predetermined signal transmission method)/10-bit, 12-bit signal, so as to generate a progressive signal.

Next, pixel samples read out from the video data regions of the first to t-th sub-images are multiplexed into the consecutive first and second class images prescribed by an m×n (where m and n indicating m samples and n lines are positive integers)/a–b (where a and b are frame rates of a progressive signal)/r:g:b (where r, g, and b are signal ratios in a case of a predetermined signal transmission method)/10-bit, 12-bit signal having the number of pixels of one frame exceeding the number of pixels prescribed by the HD-SDI format.

At this time, t vertical rectangular regions are obtained by dividing first and second class images into t (t=m/p) by p (where p is an integer equal to or more than 1) pixel samples in the horizontal direction.

Next, pixel samples read out from each line of the video data regions of the first to t-th sub-images in the horizontal direction in a unit of p pixel samples are multiplexed into the first to t-th vertical rectangular regions from the 0th line to the (n−1)-th line of the first and second class images.

In addition, pixel samples are repeatedly read out from each line of the video data regions of the first to t-th sub-images in a unit of p pixel samples m'/p times and are multiplexed, and pixel samples are read out from the next line which is vertically subsequent to the line from which the pixel samples have been read out in the first and second class images, in a unit of p pixel samples, and are multiplexed.

In one embodiment of the present disclosure, there is provided a signal transmission system which transmits the video signal and receives the video signal.

In one embodiment of the present disclosure, vertical rectangular region sampling-out, line sampling-out, and word sampling-out are performed for an input video signal in a unit of two consecutive frames (or two or more frames), and a signal where pixel samples are multiplexed into video data regions of an HD-SDI is transmitted. On the other hand, the pixel samples are extracted from the video data regions of the HD-SDI of the received signal, and word multiplexing, line multiplexing, and vertical rectangular region multiplexing are performed so as to reproduce the video signal.

According to the embodiments of the present disclosure, when a 3840×2160/100P-120P/4:4:4, 4:2:2, 4:2:0/10-bit, 12-bit signal is transmitted, various sampling-out processes are performed. In addition, pixel samples are mapped to a video data region of HD-SDIs of the mode D of the 10 Gbps serial interface. On the other hand, the pixel samples are extracted from the video data region of the HD-SDIs, and various multiplexing processes are performed for the pixel samples to reproduce the 3840×2160/100P-120P/4:4:4, 4:2:2, 4:2:0/10-bit, 12-bit signal. Therefore, a video signal where the number of pixels of one frame exceeds the number of pixels prescribed by the HD-SDI format or which has a frame rate of 100P-120P or a higher frame rate can be transmitted and received. Further, since a transmission standard used in the related art can be used without provision of a new transmission standard, there is an effect that convenience is enhanced.

BRIEF DESCRIPTION OF THE DRAWINGS

FIGS. 4A to 4C are diagrams illustrating examples of the sample structure of the UHDTV standard in 3840×2160.

FIG. 5 is a diagram illustrating an example of the data structure for one line of serial digital data of 10.692 Gbps in the case of 24P.

FIG. 8 is a diagram illustrating a processing example where the vertical rectangular region sampling-out control section according to the first embodiment of the present disclosure samples out pixel samples from first and second class images in a unit of 480 pixel samples for each line in the horizontal direction so as to map the pixel samples to first to eighth sub-images.

FIG. 9 is a diagram illustrating an example where the first to eighth sub-images according to the first embodiment of the present disclosure are sampled out for each line and then are sampled out for each word so as to be divisionally mapped to a Link A and a Link B in accordance with a prescription of the SMPTE 372M.

FIGS. 11A and 11B are diagrams illustrating an example of the data multiplexing process performed by the multiplexing section according to the first embodiment of the present disclosure.

FIG. 12 is a block diagram illustrating an internal configuration example of the signal reception apparatus in the circuit configuration of the CCU according to the first embodiment of the present disclosure.

DETAILED DESCRIPTION

Hereinafter, embodiments of the present disclosure will be described. In addition, the description will be made in the following order.

1. FIRST EMBODIMENT (mapping control of pixel samples: example of 3840×2160/100P-120P/4:4:4, 4:2:2, 4:2:0/10 bits, 12 bits)

2. SECOND EMBODIMENT (mapping control of pixel samples: example of UHDTV2 7680×4320/100P-120P/4:4:4, 4:2:2, 4:2:0/10 bits, 12 bits)

3. THIRD EMBODIMENT (mapping control of pixel samples: example of 3840×2160/(50P-60P)×N/4:4:4, 4:2:2, 4:2:0/10 bits, 12 bits)

4. FOURTH EMBODIMENT (mapping control of pixel samples: example of UHDTV2 7680×4320/(50P-60P)×N/4:4:4, 4:2:2, 4:2:0/10 bits, 12 bits)

5. FIFTH EMBODIMENT (mapping control of pixel samples: example of 4096×2160/96P-120P/4:4:4, 4:2:2/10 bits, 12 bits)

6. MODIFIED EXAMPLE

1. First Embodiment

Example of 3840×2160/100P-120P/4:4:4, 4:2:2, 4:2:0/10 Bits, 12 Bits

Hereinafter, a first embodiment of the present disclosure will be described with reference to FIGS. 1 to 13.

Here, a method of sampling-out pixel samples of a 3840×2160/100P-120P/4:4:4, 4:2:2, 4:2:0/10-bit, 12-bit signal is described in the transmission system according to the first embodiment of the present disclosure. In addition, the signal has a frame rate which is twice that of 3840×2160/50P-60P/4:4:4, 4:2:2, 4:2:0/10-bit, 12-bit signal prescribed by the SMPTE S2036-1. In addition, a digital signal format such as an inhibition code is assumed to be the same even if colorimetry is different.

Figure 1:
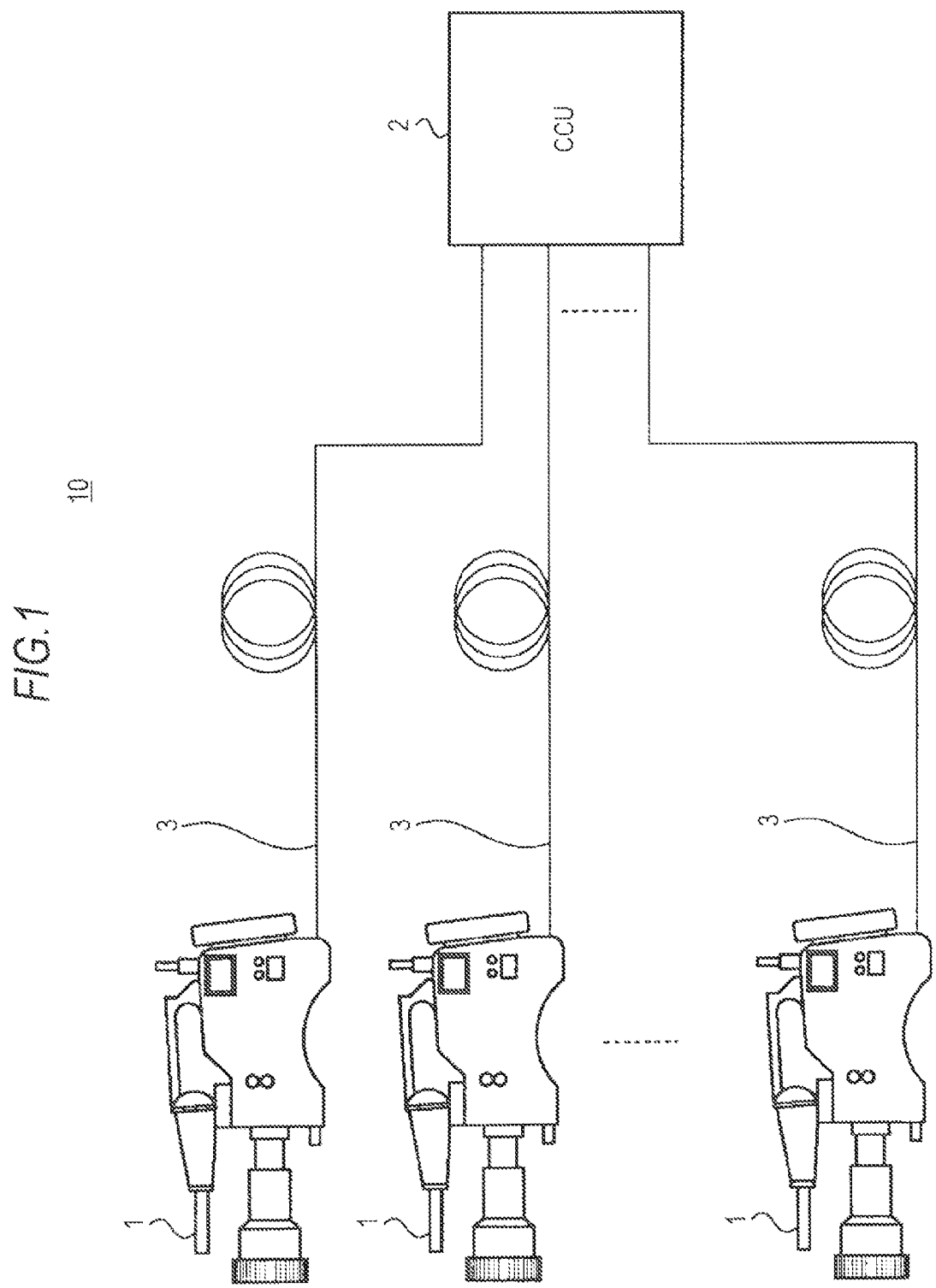
FIG. 1 is a diagram illustrating the overall configuration of a camera transmission system for a television broadcasting station according to a first embodiment of the present disclosure.

FIG. 1 is a diagram illustrating the overall configuration of the signal transmission system 10 for a television broadcasting station to which the present embodiment is applied. The signal transmission system 10 includes a plurality of broadcasting cameras 1 which have the same configuration and a camera control unit (CCU) 2, and the broadcasting cameras 1 are connected to the CCU 2 by respective optical fiber cables 3. Each of the broadcasting cameras 1 is used as a signal transmission apparatus to which a signal transmission method for transmitting a serial digital signal (video signal) is applied, and the CCU 2 is used as a signal reception apparatus to which a signal reception method for receiving the serial digital signal is applied. Further, the signal transmission system 10 which includes the combination of the broadcasting cameras 1 and the CCU 2 is used as a signal transmission system for transmitting and receiving a serial digital signal. Processes performed by the apparatuses may not only be performed along with hardware but may also be realized by executing a program.

The broadcasting cameras 1 generate a very high resolution 4 k×2 k signal (a 3840×2160/100P-120P/4:4:4, 4:2:2, 4:2:0/10-bit, 12-bit signal) of UHDTV1 and transmits the signal to the CCU 2.

The CCU 2 controls the broadcasting cameras 1, receives video signals from the broadcasting cameras 1, and transmits a video signal (return video) for causing a monitor of each broadcasting camera 1 to display images captured by the other broadcasting cameras 1. The CCU 2 functions as a signal reception apparatus for receiving video signals from the broadcasting cameras 1.

[Next Generation 2 k, 4 k, 8 k Video Signals]

Here, a next generation 2 k, 4 k, 8 k video signal will be described.

A transmission standard known as the mode D (refer to FIG. 6 described later) as an interface for transmitting and receiving video signals of various frame rates has been added to the SMPTE 435-2 and standardized as a SMPTE 435-2-2009. The SMPTE 435-2 discloses that data of a plurality of HD-SDI channels which is a 10-bit parallel stream and is prescribed by the SMPTE 292 is multiplexed into a serial interface of 10.692 Gbps. Typically, a field of the HD-SDI is sequentially formed by an EAV, a horizontal auxiliary data space (HANC data, which is also referred to as a horizontal blanking period), an SAV, and video data. In the UHDTV standard, a method where a video signal of 3840×2160/60P is transmitted with interfaces of 10 Gbps of two channels, and a video signal of 7680×4320/60P is transmitted with interfaces of 10 Gbps of eight channels, has been proposed by the SMPTE as the SMPTE 2036-3.

A video standard proposed by the ITU or the SMPTE relates to a video signal of 3840×2160 or 7680×4320 having the number of samples and the number of lines which is twice or four times those of a video signal of 1920×1080. One of the video signals which are standardized by the ITU is called LSDI (Large Screen Digital Imagery) and is called UHDTV proposed by the SMPTE. With regard to the UHDTV, signals of the following table 1 are prescribed.

TABLE 1

| System category | System Name | Luminance or Number of R'G'B' Samples per Effective Line | Number of Effective Lines per Frame | Frame Rate (Hz) |
| --- | --- | --- | --- | --- |
| UHDTV1 | 3840 × 2160/23.98/P | 3840 | 2160 | 24/1.001 |
|  | 3840 × 2160/24/P | 3840 | 2160 | 24 |
|  | 3840 × 2160/25/P | 3840 | 2160 | 25 |
|  | 3840 × 2160/29.97/P | 3840 | 2160 | 30/1.001 |
|  | 3840 × 2160/30/P | 3840 | 2160 | 30 |
|  | 3840 × 2160/50/P | 3840 | 2160 | 50 |
|  | 3840 × 2160/59.94/P | 3840 | 2160 | 60/1.001 |
|  | 3840 × 2160/60/P | 3840 | 2160 | 60 |
| UHDTV2 | 7680 × 4320/23.98/P | 7680 | 4320 | 24/1.001 |
|  | 7680 × 4320/24/P | 7680 | 4320 | 24 |
|  | 7680 × 4320/25/P | 7680 | 4320 | 25 |
|  | 7680 × 4320/29.97/P | 7680 | 4320 | 30/1.001 |
|  | 7680 × 4320/30/P | 7680 | 4320 | 30 |
|  | 7680 × 4320/50/P | 7680 | 4320 | 50 |
|  | 7680 × 4320/59.94/P | 7680 | 4320 | 60/1.001 |
|  | 7680 × 4320/60/P | 7680 | 4320 | 60 |

In addition, as a standard employed in a digital camera in the cinema industry, a signal standard of 2048×1080 or 4096×2160 is standardized as the SMPTE 2048-1,2 as shown in the following tables 2 and 3.

TABLE 2

| System Number | System Name | Frame Rate (Hz) |
| --- | --- | --- |
| 1 | 2048 × 1080/60/P | 60 |
| 2 | 2048 × 1080/59.94/P | 60/1.001 |
| 3 | 2048 × 1080/50/P | 50 |
| 4 | 2048 × 1080/48/P | 48 |
| 5 | 2048 × 1080/47.95/P | 48/1.001 |
| 6 | 2048 × 1080/30/P | 30 |
| 7 | 2048 × 1080/29.97/P | 30/1.001 |
| 8 | 2048 × 1080/25/P | 25 |
| 9 | 2048 × 1080/24/P | 24 |
| 10 | 2048 × 1080/23.98/P | 24/1.001 |

TABLE 3

| System Number | System Name | Frame Rate (Hz) |
| --- | --- | --- |
| 1 | 4096 × 2160/60/P | 60 |
| 2 | 4096 × 2160/59.94/P | 60/1.001 |
| 3 | 4096 × 2160/50/P | 50 |
| 4 | 4096 × 2160/48/P | 48 |
| 5 | 4096 × 2160/47.95/P | 48/1.001 |
| 6 | 4096 × 2160/30/P | 30 |
| 7 | 4096 × 2160/29.97/P | 30/1.001 |
| 8 | 4096 × 2160/25/P | 25 |
| 9 | 4096 × 2160/24/P | 24 |
| 10 | 4096 × 2160/23.98/P | 24/1.001 |

(DWDM/CWDM Wavelength Multiplexing Transmission Technique)

Here, a DWDM/CWDM wavelength multiplexing transmission technique is described.

A method of multiplexing light of a plurality of wavelengths into a single optical fiber and transmitting the multiplexed light is called WDM (Wavelength Division Multiplexing). The WDM is substantially divided into the following three methods depending on the wavelength interval.

(1) Two-Wavelength Multiplexing Method

Signals of different wavelengths such as 1.3 µm and 1.55 µm are multiplexed into two or three waves and are transmitted through a single optical fiber in the two-wavelength multiplexing method.

(2) DWDM (Dense Wavelength Division Multiplexing) Method

The DWDM is a method of multiplexing and transmitting light with a high density in light frequency of 25 GHz, 50 GHz, 100 GHz, 200 particularly in the 1.55 µm band. The interval is a wavelength interval of approximately 0.2 nm, 0.4 nm, 0.8 nm . . . Standardization of the center frequency and the like has been performed by the ITU-T (International Telecommunication Union Telecommunication standardization sector). Since the wavelength interval of the DWDM is as narrow as 100 GHz, the number of waves to be multiplexed can be made as great as several tens to a hundred and communication of a very high capacity is possible. However, since it is necessary for the oscillation wavelength width to be sufficiently narrower than the wavelength interval of 100 GHz and it is necessary for the temperature of the semiconductor laser to be controlled so that the center frequencies correspond with the ITU-T standard, the device is expensive and power consumption in the system is increased.

(3) CWDM (Coarse Wavelength Division Multiplexing) Method

The CWDM is a wavelength multiplexing technique where the wavelength interval is set to 10 to 20 nm which is greater by more than one digit than that in the DWDM. Since the wavelength interval is comparatively great, there is no necessity to set the oscillation wavelength width of the semiconductor layer so narrow as that in the DWDM, and there is no necessity to control the temperature of the semiconductor laser either. Therefore, it is possible to configure the system at a low cost and with low power consumption. This technique is effectively applicable to a system where there is no necessity for a large capacity as the DWDM. In relation to the center frequencies, in the case of a 4-channel configuration, for example, 1.511 µm, 1.531 µm, 1.551 µm, and 1.571 µm are currently applied, and in the case of an 8-channel configuration, for example, 1.471 µm, 1.491 µm, 1.511 µm, 1.531 µm, 1.551 µm, 1.571 µm, 1.591 µm, and 1.611 µm are currently applied.

The 3840×2160/100P-120P/4:4:4, 4:2:2, 4:2:0/10-bit, 12-bit signal described in the present embodiment is has a frame rate which is twice that of a signal prescribed by the SMPTE S2036-1. The signal prescribed by the SMPTE S2036-1 is a 3840×2160/50P-60P/4:4:4, 4:2:2, 4:2:0/10-bit, 12-bit signal. In addition, a digital signal format such as an inhibition code is assumed to be same as that of a signal in the related art prescribed by the S2036-1.

Figure 2:
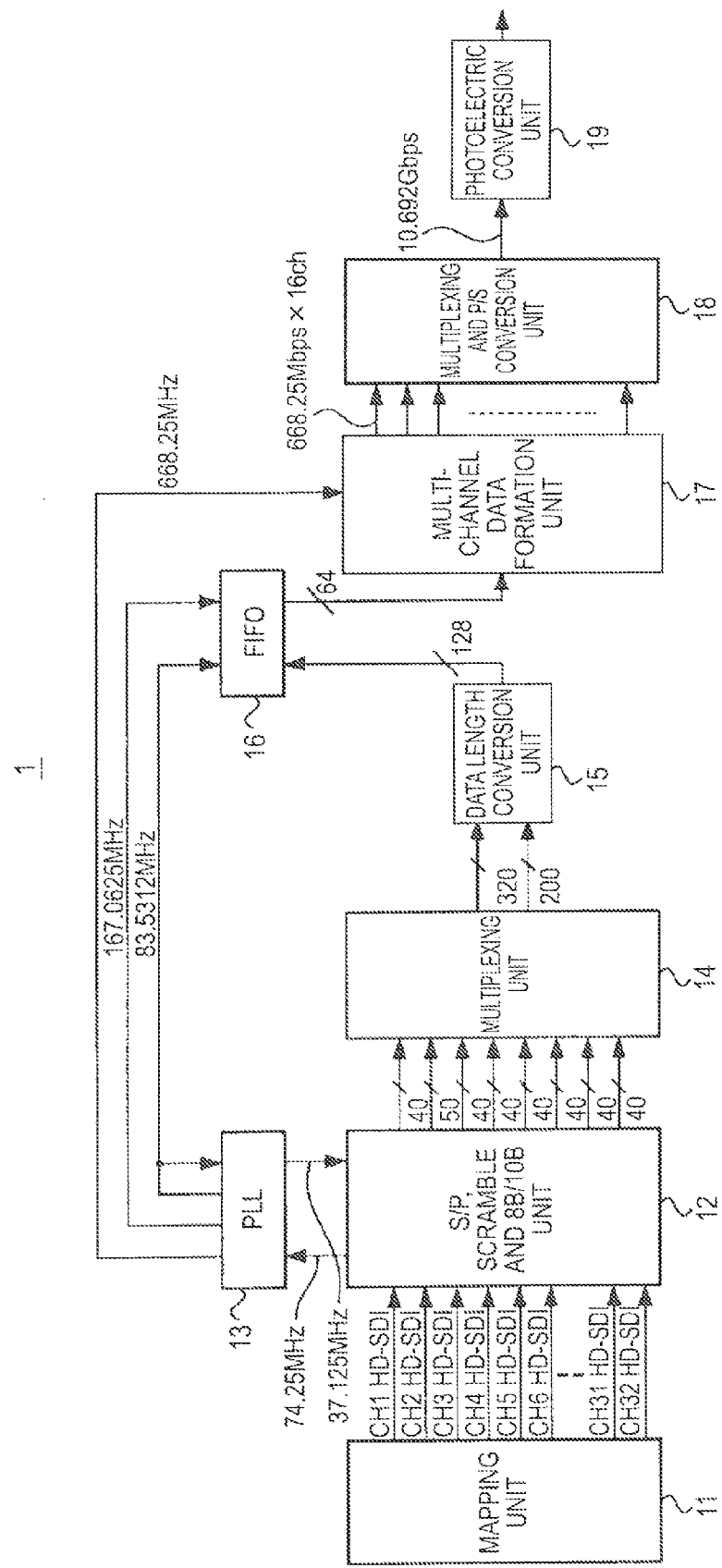
FIG. 2 is a block diagram illustrating an internal configuration example of the signal transmission apparatus in the circuit configuration of the broadcasting camera according to the first embodiment of the present disclosure.

FIG. 2 is a block diagram of a signal transmission apparatus according to the present embodiment of the circuit configuration of the broadcasting camera 1. A 3840×2160/100P-120P/4:4:4, 4:2:2, 4:2:0/10-bit, 12-bit signal generated by an imaging section and an image signal processing section (not shown) in the broadcasting camera 1 is sent to a mapping unit 11.

The 3840×2160/100P-120P/4:4:4, 4:2:2, 4:2:0/10-bit, 12-bit signal corresponds to one frame of the UHDTV1 class image. In addition, the signal has a 30-bit or 36-bit width where a G data sequence, a B data sequence and an R data sequence all having a word length of 10 bits or 12 bits are disposed in parallel to and in synchronization with each other. The one frame period of the signal is $\frac{1}{100}$, $\frac{1}{119.88}$ or $\frac{1}{120}$ second and includes a period of 2160 effective lines. For this reason, the number of pixels of one frame of the video signal exceeds the number of pixels prescribed by the HD-SDI format. Then, an audio signal is input in synchronization with the video signal.

The number of samples of the active line of the UHDTV1 and 2 prescribed by S2036-1 is 3840 and the number of lines is 2160, and video data of G, B and R are disposed in the active lines of the G data sequence, B data sequence and R data sequence, respectively.

The mapping unit 11 maps the 3840×2160/100P-120P/4:4:4, 4:2:2, 4:2:0/10-bit, 12-bit signal to a video data region of 32 channels prescribed by the HD-SDI format.

[Internal Configuration and Operation Example of Mapping Section]

Here, an internal configuration and an operation example of the mapping unit 11 will be described.

Figure 3:
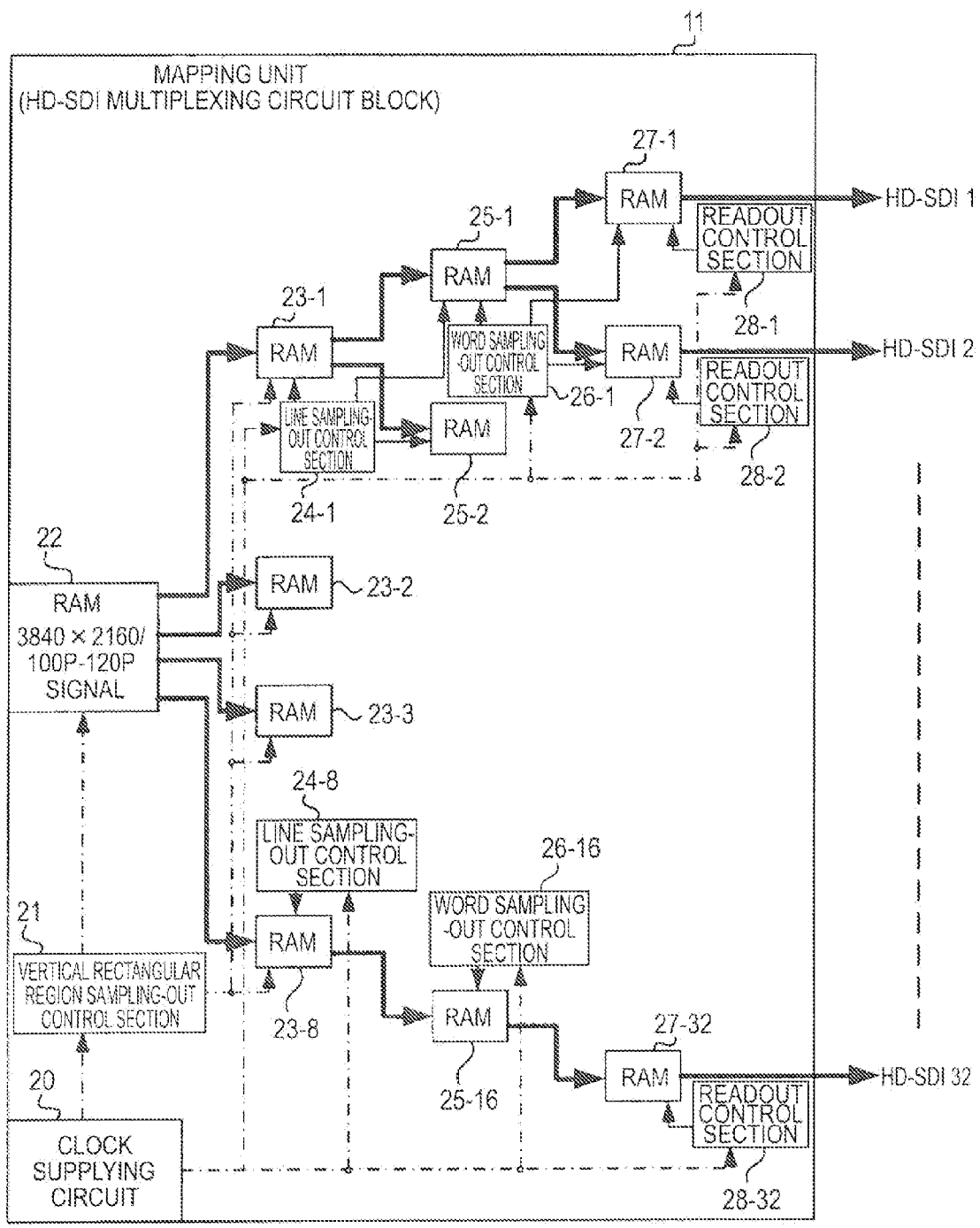
FIG. 3 is a block diagram illustrating an internal configuration example of the mapping section according to the first embodiment of the present disclosure.

FIG. 3 shows an example of the internal configuration of the mapping unit 11.

The mapping unit 11 includes a clock supplying circuit 20 for supplying a clock to components of the mapping unit 11, and a RAM 22 for storing a 3840×2160/100P-120P video signal. Further, the mapping unit 11 includes a vertical rectangular region sampling-out control section 21 which controls vertical rectangular region sampling-out (interleave) for reading out pixel samples in a unit of p pixel samples for each line in the horizontal direction from first and second UHDTV1 class images. The vertical rectangular region sampling-out control section 21 reads out pixel samples from the first and second UHDTV1 class images of two continuous frames from the RAM 22. In this example, p is 480, and, hereinafter, description will be made as "480 pixel samples".

The mapping unit 11 includes RAMs 23-1 to 23-8 which respectively store the 480 pixel samples which have been sampled out in the horizontal direction from the UHDTV1 class image in the video data regions of first to eighth sub-images. The 480 pixel samples sampled out by the vertical rectangular region sampling-out control section 21 are obtained by dividing "3840" which is the number of pixel samples in the horizontal direction in the UHDTV1 class image by "8" which is the number of the first to eighth sub-images to which the pixel samples are mapped. In the following description, a rectangular region which is obtained by dividing the UHDTV1 class image by t (where t is an integer equal to or more than 8) in a unit of p pixel samples, and has a long side in the vertical direction and a short side in the horizontal direction, is referred to as a "vertical rectangular region".

Further, the mapping unit 11 includes line sampling-out control sections 24-1 to 24-8 which controls line sampling-out of the first to eighth sub-images stored in the RAMs 23-1 to 23-8. The mapping unit 11 includes RAMs 25-1 to 25-16 in which lines sampled out by the line sampling-out control sections 24-1 to 24-8 are written.

Further, the mapping unit 11 includes word sampling-out control sections 26-1 to 26-16 which controls word sampling-out of data read out from the RAMs 25-1 to 25-16. The mapping unit 11 further includes RAMs 27-1 to 27-32 in which words sampled out by the word sampling control sections 26-1 to 26-16 are written.

In addition, the mapping unit 11 includes readout control sections 28-1 to 28-32 which output the words read out from the RAMs 27-1 to 27-32 as HD-SDIs of 32 channels.

Although FIG. 3 shows the blocks for generating the HD-SDIs 1 and 2, blocks for generating HD-SDIs 3 to 32 have a similar configuration, and therefore, illustration and detailed description of the blocks will be omitted.

Next, an operation example of the mapping unit 11 will be described.

The clock supplying circuit 20 supplies clocks to the vertical rectangular region sampling-out control section 21, the line sampling-out control sections 24-1 to 24-8, word sampling-out control sections 26-1 to 26-16, and the readout control sections 28-1 to 28-32. The clocks are used for reading out or writing of pixel samples, and the blocks of the mapping unit 11 operate in synchronization with each other.

A video signal prescribed by the UHDTV1 class image input from an image sensor (not shown) and having the number of pixels of one frame which exceeds the number of pixels prescribed by the HD-SDI format whose number of pixels of one frame is a maximum of 3840×2160 is stored in the RAM 22. The UHDTV1 class image forms consecutive first and second class images. The UHDTV1 class image indicates a 3840×2160/100P-120P/4:4:4, 4:2:2, 4:2:0/10-bit, 12-bit signal. Here, a 1920×1080/50P-60P/4:4:4, 4:2:2, 4:2:0/10-bit, 12-bit signal is referred to as a "sub-image". In this example, pixel samples which are sampled out for each vertical rectangular region and every 480 pixel samples in the horizontal direction from the UHDTV1 class image which is input in a unit of two consecutive frames are mapped to video data regions of the first to t-th sub-images. Here, t is an integer equal to or more than 8, and, in this example, a process where pixel samples are mapped to video data regions of the first to eighth sub-images will be described.

The vertical rectangular region sampling-out control section 21 samples out pixel samples every 480 pixel samples in the horizontal direction in a unit of two consecutive frames from the UHDTV1 class image. In addition, the pixel samples are mapped to video data region of the first to eighth sub-images corresponding to 1920×1080/50P-60P prescribed by SMPTE 435-1. A detailed processing example of the mapping will be described later.

Next, the line sampling-out control sections 24-1 to 24-8 convert a progressive signal into an interlace signal. Specifically, the line sampling-out control sections 24-1 to 24-8 read out the pixel samples mapped to the video data regions of the first to eighth sub-images from the RAMs 23-1 to 23-8. At this time, the line sampling-out control sections 24-1 to 24-8 convert one sub-image into 1920×1080/50I-60I/4:4:4, 4:2:2, 4:2:0/10-bit, 12-bit signals of two channels. Then, the line sampling-out control sections 24-1 to 24-8 sample out every other line from the video data regions of the first to eighth sub-images to form a 1920×1080/50I-60I signal in the form of an interlace signal which is stored in the RAMs 23-1 to 23-8.

Next, the word sampling-out control sections 26-1 to 26-16 sample out for each word the pixel samples which have been sampled out for each line, and map the pixel samples to video data regions of the HD-SDIs prescribed by the SMPTE 435-1. At this time, the word sampling-out control sections 26-1 to 26-16 multiplex the pixel samples into video data regions of a 10.692 Gbps stream defined by the four-channel mode D which is prescribed by the SMPTE 435-1 and corresponds to each of the first to eighth sub-images. In other words, the word sampling-out control sections 26-1 to 26-16 converts the 1920×1080/50I-60I/4:4:4, 4:2:2, 4:2:0/10-bit, 12-bit signals into thirty-two HD-SDIs. In addition, each of the first to eighth sub-images is mapped to the video data regions of four HD-SDIs prescribed by the SMPTE 435-1.

Specifically, the word sampling-out control sections 26-1 to 26-16 respectively read out pixel samples from the RAMs 23-1 to 23-8, by sampling out the pixel samples for each word by the same method as that of FIGS. 4A to 4C, 6, 7, 8 and 9 of the SMPTE 372. Then, the word sampling-out control sections 26-1 to 26-16 convert the read out pixel samples individually into 1920×1080/50I-60I signals of two channels and store the signals into the RAMs 27-1 to 27-32.

Thereafter, the readout control sections 28-1 to 28-32 output a transmission stream of thirty-two HD-SDIs read out from the RAMs 27-1 to 27-32.

Specifically, the readout control section 28-1 to 28-32 read out pixel samples from the RAMs 27-1 to 27-32, respectively, in response to a reference clock supplied thereto from the clock supplying circuit 20. Then, the HD-SDIs 1 to 32 of 32 channels formed from 16 pairs of two Links A and B are output to an S/P, scramble and 8B/10B section 12 in the subsequent stage.

In this example, in order to perform the vertical rectangular region sampling-out, the line sampling-out, and the word sampling-out, three kinds of memories, that is, the RAMs 23-1 to 23-8, RAMs 25-1 to 25-16, and RAMS 27-1 to 27-32, are used, and the sampling-out processes are performed at three stages. However, a single memory may be used to store data obtained by perform the vertical rectangular region sampling-out, the line sampling-out, and the word sampling-out so that the data are output as HD-SDIs of 32 channels.

[Example of Sample Structure of UHDTV Signal Standard]

Here, an example of the sample structure of the UHDTV signal standard will be described with reference to FIGS. 4A to 4C.

FIGS. 4A to 4C are diagrams illustrating examples of the sample structure of the UHDTV signal standard for 3840×2160. As a frame used in the description with reference to FIGS. 4A to 4C, one frame is formed by 3840×2160.

The sample structure of the signal standard for 3840×2160 includes the following three sample structures. In the SMPTE standard, a signal having a dash """ applied thereto such as R', G' or B' indicates a signal to which gamma correction is applied.

FIG. 4A shows an example of the R'G'B', Y'Cb'Cr' 4:4:4 system. In this system, RGB or YCbCr components are included in all samples.

FIG. 4B illustrates an example of the Y'Cb'Cr' 4:2:2 system. In this system, YCbCr components are included in even-numbered samples, and a Y component is included in odd-numbered samples.

FIG. 4C illustrates an example of the Y'Cb'Cr' 4:2:0 system. In this system, YCbCr components are included in even-numbered samples, and a Y component is included in odd-numbered samples, and further, the components from which CbCr components in odd-numbered lines are sampled out are included therein.

[Configuration Example of Serial Data of 10.692 Gbps]

Next, a configuration example of serial data of 10.692 Gbps prescribed by the HD-SDI format of one line will be described with reference to FIG. 5.

FIG. 5 shows an example of the data structure for one line of serial digital data of 10.692 Gbps in the case where the frame rate is 24P.

In FIG. 5, serial digital data including a line number LN and error correction codes CRC are indicated as SAV, active line and EAV, and serial digital data including a region for additional data are indicated as horizontal auxiliary data space. An audio signal is mapped to the horizontal auxiliary data space, complementary data is added to the audio signal to form the horizontal auxiliary data space, and thus the audio signal can be synchronized with an input HD-SDI.

[Description of Mode D]

Figure 6:
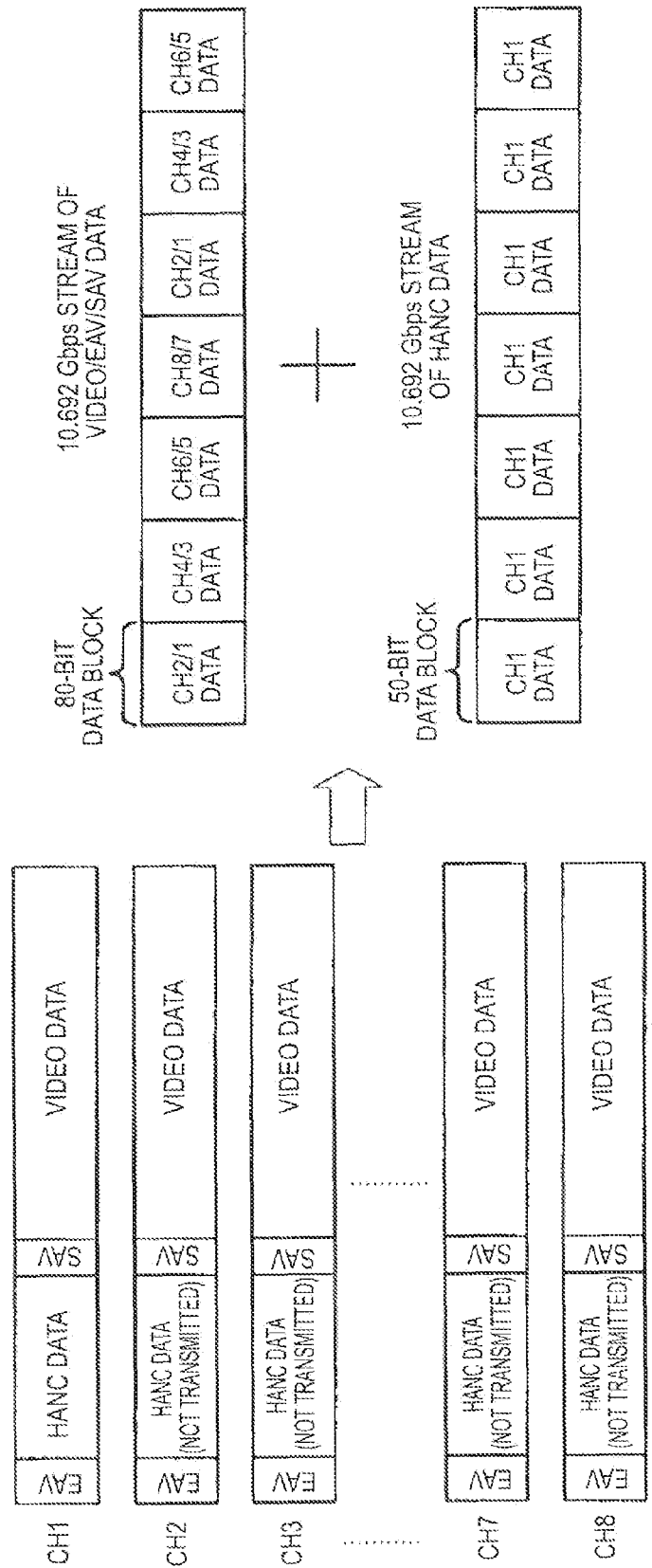
FIG. 6 is a diagram illustrating an example of the mode D.

Next, an example of multiplexing data included in the HD-SDIs of a plurality of channels with reference to FIG. 6. A method of multiplexing data is prescribed as the mode D by the SMPTE 435-2.

FIG. 6 is a diagram illustrating the mode D.

The mode D is a method of multiplexing HD-SDIs of eight channels CH1 to CH8, and prescribes that data is multiplexed into the video data region and the horizontal auxiliary data space of a 10.692 Gbps stream. At this time, the video/EAV/SAV data of the HD-SDIs of the channels CH1, CH3, CH5 and CH7 are extracted by 40 bits and scrambled so as to be converted into data of 40 bits. On the other hand, the video/EAV/SAV data of the HD-SDIs of the channels CH2, CH4, CH6 and CH8 are extracted by 32 bits and converted into data of 40 bits by 8B/10B conversion. The data are added to each other to form data of 80 bits. The encoded 8-word or 80-bit data is multiplexed into the video data region of the 10.692 Gbps stream.

At this time, to the first half data block of 40 bits of the data block of 80 bits, the data block of 40 bits of the even-numbered channels obtained by the 8B/10B conversion may be allocated. Then, to the second half data block of 40 bits, the data block of scrambled 40 bits of the odd-numbered channels may be allocated. Therefore, into the one data block, for example, the data blocks are multiplexed in the order of, for example, the channels CH2 and CH1. The reason why the order is changed in this manner is that a content ID for identifying a mode to be used is included in the data block of 40 bits of the even-numbered channels obtained by the 8B/10B conversion.

Meanwhile, the horizontal auxiliary data space of the HD-SDI of the channel CH1 undergoes 8B/10B conversion and is encoded into a data block of 50 bits. Then, the data block is multiplexed into the horizontal auxiliary data space of the 10.692 Gbps stream. However, the horizontal auxiliary data spaces of the HD-SDIs of the channels CH2 to CH8 are not transmitted.

Next, a detailed processing example of steps where the mapping unit 11 maps pixel samples will be described.

Figure 7:
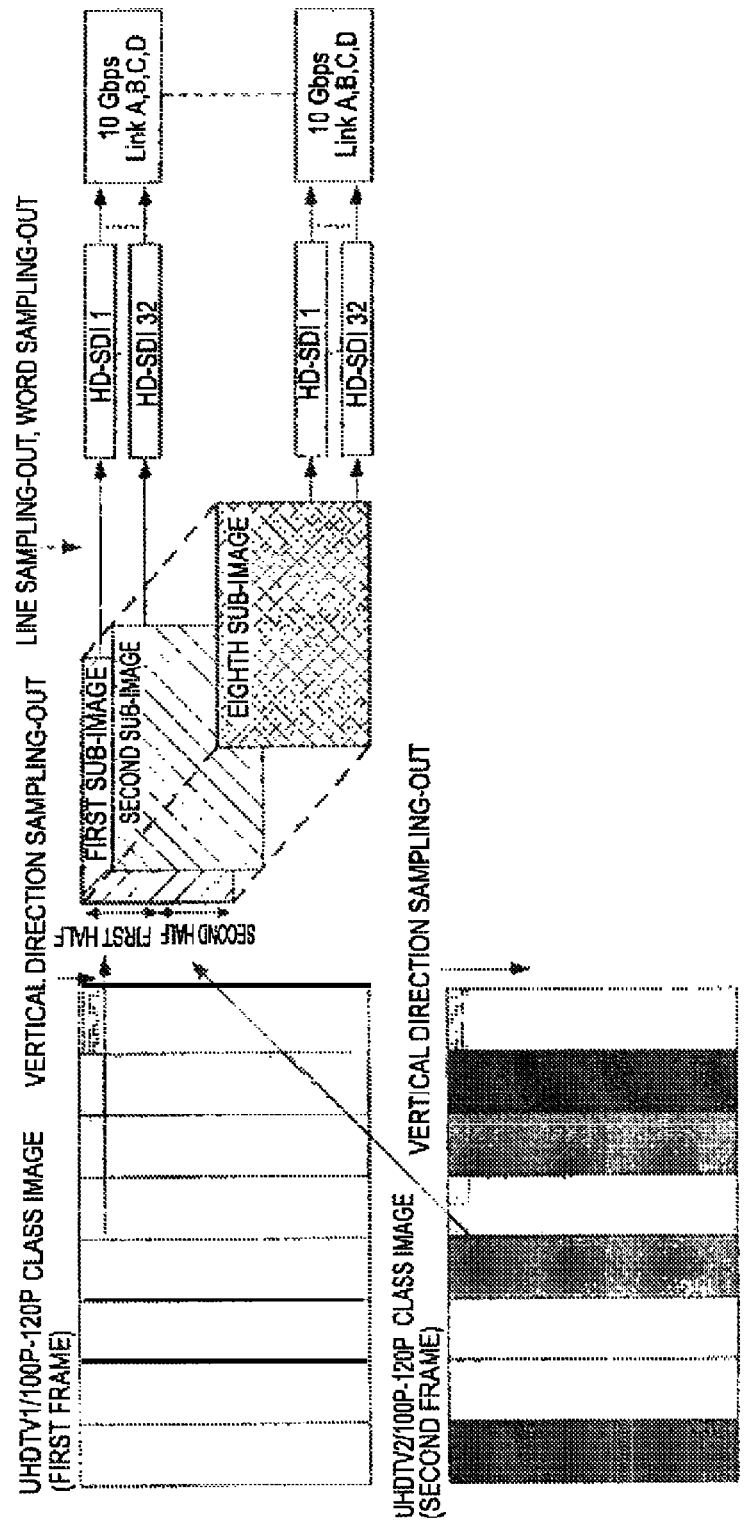
FIG. 7 is a diagram illustrating a processing example where the mapping section according to the first embodiment of the present disclosure maps pixel samples.

FIG. 7 is a diagram illustrating an example where the mapping unit 11 maps pixel samples included consecutive first and second frames of the UHDTV1 class image to the first to eighth sub-images, and maps the pixel samples to the HD-SDIs of 32 channels.

The vertical rectangular region sampling-out control section 21 divides one frame (one image plane) into eight regions for each vertical rectangular region which has the vertical direction width of 480 pixel samples, thereby obtaining first to eighth vertical rectangular regions. Based on the vertical rectangular regions, the 3840×2160/100P-120P/4:4:4, 4:2:2, 4:2:0/10-bit, 12-bit signal is mapped to the first to eighth sub-images. Each of the first to eighth sub-images is a 1920× 1080/50P-60P/4:4:4, 4:2:2, 4:2:0/10-bit, 12-bit signal.

At this time, one frame (one image plane) is sequentially sampled out in a unit 480 pixel samples in the horizontal direction from the UHDTV1 class image of the first frame which is the 3840×2160/100P-120P/4:4:4, 4:2:2, 4:2:0/10-bit, 12-bit signal. In addition, the signals sampled out in a unit of 480 pixel samples are respectively mapped to the first half parts of the video data regions of the 1920×1080/50P-60P/4:4:4, 4:2:2, 4:2:0/10-bit, 12-bit signals of eight channels. Here, the first to 540th lines of the video data region are referred to as "a first half part of the video data region".

Thereafter, the mapping unit 11 samples out pixel samples in a unit of 480 pixel samples in the horizontal direction from the UHDTV1 class image of the second frame. In addition, the signals sampled out in a unit of 480 pixel samples are respectively mapped to the second half parts of the video data regions of the 1920×1080/50P-60P/4:4:4, 4:2:2, 4:2:0/10-bit, 12-bit signals of eight channels. Here, the 541st to 1080th lines of the video data region are referred to as "a second half part of the video data region". In addition, the first to eighth sub-images to which the pixel samples are mapped to 1920 samples which correspond to the video data region of the HD image format are created. In the following description, the UHDTV1 class image of the first frame is referred to as a "first class image", and the UHDTV1 class image of the second frame is referred to as a "second class image".

Next, the line sampling-out control sections 24-1 to 24-8 performs line sampling-out, and the word sampling-out control sections 26-1 to 26-16 performs word sampling-out, thereby generating 1920×1080/23.98P-30P/4:2:2/10-bit signals of 32 channels. In addition, the readout control section 28-1 to 28-32 read out the HD-SDIs 1 to 32, and output the HD-SDI as quadlink of Link A, B, C and D of 10 Gbps.

Next, a detailed processing example where each processing block in the mapping unit 11 maps pixel samples will be described with reference to FIGS. 8 to 11.

FIG. 8 shows an example where the vertical rectangular region sampling-out control section 21 samples out pixel samples in a unit of 480 pixel samples for each line in the horizontal direction from the consecutive first and second class images and maps the pixel samples to the first to eighth sub-images.

The vertical rectangular region sampling-out control section 21 maps the pixel samples of the 3840×2160/100P-120P/4:4:4, 4:2:2, 4:2:0/10-bit, 12-bit signal defined as the UHDTV1 class image, to the first to eighth sub-images. At this time, the mapping unit 11 samples out the pixel samples in a unit of 480 pixel samples in the horizontal direction for each line of the UHDTV1 class image and maps the pixel samples to the first to eighth sub-images.

The vertical rectangular region sampling-out control section 21 samples out pixel samples of the 3840×2160/100P-120P/4:4:4, 4:2:2, 4:2:0/10-bit, 12-bit signal every two frames in the horizontal direction of the first to eighth vertical rectangular regions. The sampling-out process is performed in a unit of 480 pixel samples, and the sampled-out pixel samples are multiplexed into the video data regions of the first to eighth sub-images. The first to eighth sub-images are prescribed by 1920×1080/50P-60P/4:4:4, 4:2:2, 4:2:0/10-bit, 12-bit signals of eight channels. In addition, the 3840×2160/100P-120P/4:4:4, 4:2:2, 4:2:0/10-bit, 12-bit signal has a frame rate which is twice that of a 3840×2160/50P-60P/4:4:4, 4:2:2, 4:2:0/10-bit, 12-bit signal prescribed by S2036-1. 1920×1080/50P-60P is defined by the SMPTE 274M. A digital signal format such as an inhibit code of the 3840×2160/100P-120P/4:4:4, 4:2:2, 4:2:0/10-bit, 12-bit signal is the same as that of 1920×1080/50P-60P.

Here, the UHDTV1 class image where the number of pixels of one frame exceeds the number of pixels prescribed by the HD-SDI format is prescribed as follows. That is to say, the UHDTV1 class image is prescribed by an m×n (where m and n indicating m samples and n lines are positive integers)/a–b (where a and b are frame rates of a progressive signal)/r:g:b (where r, g, and b are signal ratios in a case of a predetermined signal transmission method)/10-bit, 12-bit signal. In this example, in the UHDTV1 class image, m×n is 3840×2160, a–b is 100P, 119.88P, 120P, r:g:b is 4:4:4, 4:4:2, 4:2:0. In the UHDTV1 class image, the pixel samples are stored over 0th line to 2159th line.

In addition, in the UHDTV1 class image, the lines are defined by the consecutive 0th line, first line, second line, third line, . . . , and 2159th line, and each width in the horizontal direction of the first to eighth vertical rectangular regions is defined every 480 pixel samples. The vertical rectangular region sampling-out control section 21 samples out pixel samples from the consecutive first and second UHDTV1 class images. In addition, the vertical rectangular region sampling-out control section 21 maps the pixel samples to the video data regions of the first to eighth sub-images prescribed by a m'×n'/a'–b'/r':g':b'/10-bit, 12-bit signal. Here, m' and n' indicating m' samples and n' lines are positive integers, a' and b' are frame rates of a progressive signal, and r', g', and b' are signal ratios in a case of a predetermined signal transmission method.

The vertical rectangular region sampling-out control section 21 maps the pixel samples to the video data regions of the first to eighth sub-images where m'×n' is 1920×1080, a'–b' is 50P-60P, r':g':b' is 4:4:4, 4:2:2, 4:2:0. At this time, the vertical rectangular region sampling-out control section 21 maps pixel samples read out for each line of the 0th line to the (n–1)-th line in the first and second class images. The mapping process is performed in a unit of p pixel samples in the horizontal direction of each line of the video data regions of the first to t-th sub-images for each of the first to t-th vertical rectangular regions. Further, the mapping process is repeatedly performed in the order of the first class image and the second class image. In addition, the pixel samples are mapped to each line of the video data regions of the first to t-th sub-images in a unit of p pixel samples m'/p times. Further, pixel samples are repeatedly mapped to the next line which is vertically subsequent to the line to which the pixel samples have been mapped, in a unit of p pixel samples.

Specifically, for example, the 0th to 479th pixel samples in the line 0 of the UHDTV1 class image are mapped to the 0th to 479th positions of the first line in the video data region of the first sub-image. In addition, the 480th to 959th pixel samples in the line 0 of the UHDTV1 class image, which are read out from the same line, are mapped to the 0th to 479th positions of the first line in the video data region of the second sub-image.

This mapping process is repeatedly performed until the 3360th to 3839th pixel samples in the line 0 of the UHDTV1 class image are mapped to the 0th to 479th positions of the first line in the video data region of the eighth sub-image.

Next, pixel samples read out from the line 1 of the UHDTV1 class image are mapped to the video data regions of the first to eighth sub-images. In this way, the process where the pixel samples read out from the respective lines are mapped to the video data regions of the first to eighth sub-images are repeatedly performed up to the 2159th line.

The mapping process is performed in detail as follows.

(1) The samples 0 to 479 of the line 0 of 3840×2160/120P of the first frame are multiplexed into samples 0 to 479 of the line 0 of the first sub-image 1920×1080.

(2) The samples 480 to 959 of the line 0 of 3840×2160/120P of the first frame are multiplexed into samples 0 to 479 of the line 0 of the second sub-image 1920×1080.

(3) The samples 960 to 1439 of the line 0 of 3840×2160/120P of the first frame are multiplexed into samples 0 to 479 of the line 0 of the third sub-image 1920×1080.

(4) The samples 1440 to 1919 of the line 0 of 3840×2160/120P of the first frame are multiplexed into samples 0 to 479 of the line 0 of the fourth sub-image 1920×1080.

(5) The samples 1920 to 2399 of the line 0 of 3840×2160/120P of the first frame are multiplexed into samples 0 to 479 of the line 0 of the fifth sub-image 1920×1080.

(6) The samples 2400 to 2879 of the line 0 of 3840×2160/120P of the first frame are multiplexed into samples 0 to 479 of the line 0 of the sixth sub-image 1920×1080.

(7) The samples 2880 to 3359 of the line 0 of 3840×2160/120P of the first frame are multiplexed into samples 0 to 479 of the line 0 of the seventh sub-image 1920×1080.

(8) The samples 3360 to 3839 of the line 0 of 3840×2160/120P of the first frame are multiplexed into samples 0 to 479 of the line 0 of the eighth sub-image 1920×1080.

(9) The samples 0 to 479 of the line 1 of 3840×2160/120P of the first frame are multiplexed into samples 480 to 959 of the line 0 of the first sub-image 1920×1080.

(10) The samples 480 to 959 of the line 1 of 3840×2160/120P of the first frame are multiplexed into samples 480 to 959 of the line 0 of the second sub-image 1920×1080.

(11) The samples 960 to 1439 of the line 1 of 3840×2160/120P of the first frame are multiplexed into samples 480 to 959 of the line 0 of the third sub-image 1920×1080.

(12) The samples 1440 to 1919 of the line 1 of 3840×2160/120P of the first frame are multiplexed into samples 480 to 959 of the line 0 of the fourth sub-image 1920×1080.

(13) The samples 1920 to 2399 of the line 1 of 3840×2160/120P of the first frame are multiplexed into samples 480 to 959 of the line 0 of the fifth sub-image 1920×1080.

(14) The samples 2400 to 2789 of the line 1 of 3840×2160/120P of the first frame are multiplexed into samples 480 to 959 of the line 0 of the sixth sub-image 1920×1080.

(15) The samples 2880 to 3359 of the line 1 of 3840×2160/120P of the first frame are multiplexed into samples 480 to 959 of the line 0 of the seventh sub-image 1920×1080.

(16) The samples 3360 to 3839 of the line 1 of 3840×2160/120P of the first frame are multiplexed into samples 480 to 959 of the line 0 of the eighth sub-image 1920×1080.

(17) The samples 0 to 479 of the line 2 of 3840×2160/120P of the first frame are multiplexed into samples 960 to 1439 of the line 0 of the first sub-image 1920×1080.

(18) The samples 480 to 959 of the line 2 of 3840×2160/120P of the first frame are multiplexed into samples 960 to 1439 of the line 0 of the second sub-image 1920×1080.

(19) The samples 960 to 1439 of the line 2 of 3840×2160/120P of the first frame are multiplexed into samples 960 to 1439 of the line 0 of the third sub-image 1920×1080.

(20) The samples 1440 to 1919 of the line 2 of 3840×2160/120P of the first frame are multiplexed into samples 960 to 1439 of the line 0 of the fourth sub-image 1920×1080.

(21) The samples 1920 to 2399 of the line 2 of 3840×2160/120P of the first frame are multiplexed into samples 960 to 1439 of the line 0 of the fifth sub-image 1920×1080.

(22) The samples 2400 to 2879 of the line 2 of 3840×2160/120P of the first frame are multiplexed into samples 960 to 1439 of the line 0 of the sixth sub-image 1920×1080.

(23) The samples 2880 to 3359 of the line 2 of 3840×2160/120P of the first frame are multiplexed into samples 960 to 1439 of the line 0 of the seventh sub-image 1920×1080.

(24) The samples 3360 to 3839 of the line 2 of 3840×2160/120P of the first frame are multiplexed into samples 960 to 1439 of the line 0 of the eighth sub-image 1920×1080.

(25) The samples 0 to 479 of the line 3 of 3840×2160/120P of the first frame are multiplexed into samples 1440 to 1919 of the line 0 of the first sub-image 1920×1080.

(26) The samples 480 to 959 of the line 3 of 3840×2160/120P of the first frame are multiplexed into samples 1440 to 1919 of the line 0 of the second sub-image 1920×1080.

(27) The samples 960 to 1439 of the line 3 of 3840×2160/120P of the first frame are multiplexed into samples 1440 to 1919 of the line 0 of the third sub-image 1920×1080.

(28) The samples 1440 to 1919 of the line 3 of 3840×2160/120P of the first frame are multiplexed into samples 1440 to 1919 of the line 0 of the fourth sub-image 1920×1080.

(29) The samples 1920 to 2399 of the line 3 of 3840×2160/120P of the first frame are multiplexed into samples 1440 to 1919 of the line 0 of the fifth sub-image 1920×1080.

(30) The samples 2400 to 2789 of the line 3 of 3840×2160/120P of the first frame are multiplexed into samples 1440 to 1919 of the line 0 of the sixth sub-image 1920×1080.

(31) The samples 2880 to 3359 of the line 3 of 3840×2160/120P of the first frame are multiplexed into samples 1440 to 1919 of the line 0 of the seventh sub-image 1920×1080.

(32) The samples 3360 to 3839 of the line 3 of 3840×2160/120P of the first frame are multiplexed into samples 1440 to 1919 of the line 0 of the eighth sub-image 1920×1080.

In this way, the vertical rectangular region sampling-out control section 21 maps the pixel samples read out from each line of the first UHDTV1 class image in a unit of 480 pixel samples in the horizontal direction to the video data regions of the first half parts of the first to eighth sub-images. In addition, the pixel samples are mapped to the video data regions of the first to eighth sub-images in the order of the arrangement of the vertical rectangular regions in the UHDTV1 class image.

Similarly, the vertical rectangular region sampling-out control section 21 maps pixel samples read out from each line of the second UHDTV1 class image in a unit of 480 pixel samples in the horizontal direction to the video data regions of the second half part of the first to eighth sub-images. In addition, in a case of a signal of 4:2:0, a default value is allocated to the 0 signal. Further, in a case of 10 bits, 200h is allocated as a default value, and in a case of 12 bits, 800h is allocated as a default value.

In addition, if the pixel samples are sampled out by four lines in the horizontal direction in a unit of 480 pixel samples every two consecutive frames, the number of the pixel samples after being multiplexed into the sub-images is 3840/8×4=1920 samples. The number of lines after the vertical rectangular regions are sampled out every two frames in the horizontal direction is 2160/4×2=1080 lines. For this reason, the video data regions of 1920×1080 correspond with the number of pixel samples and the number of lines which are sampled out from the first and second class images and then are multiplexed into the first to eighth sub-images.

Next, the line sampling-out control sections 24-1 to 24-8 sample out the pixel samples every other line from each of the first to eighth sub-images to which the pixel samples are mapped, so as to generate an interlace signal.

Here, the mapping unit 11 maps 200h (10-bit system) or 800h (12-bit system), which are default values of the C channel, to 0 of 4:2:0 so as to treat a signal of 4:2:0 as a signal equivalent to a signal of 4:2:2. Then, the first to eighth sub-images are stored into the RAMs 23-1 to 23-8, respectively.

FIG. 9 shows an example where the first to eighth sub-images undergo line sampling-out, then word sampling-out, and are divided into the Link A or the Link B according to the prescription of the SMPTE 372M.

The SMPTE 435 is a standard of the 10G interface. This standard defines that HD-SDI signals of a plurality of channels are converted into signals of 50 bits through 8B/10B encoding in a unit of two pixels (40 bits), and are multiplexed for each channel. Further, the standard defines that signals are serially transmitted at a bit rate of 10.692 Gbps or 10.692 Gbps/1.001 (hereinafter, simply referred to as 10.692 Gbps). A technique for mapping the 4 k×2 k signal to an HD-SDI signal is shown in FIGS. 3 and 4 of 6.4 Octa link 1.5 Gbps Class of SMPTE 435 Part 1.

The line sampling-out is performed from the first to eighth sub-images set by the 1920×1080/50P-60P/4:4:4, 4:2:2/10-bit, 12-bit signals by a method defined in FIG. 2 of the SMPTE 435-1. In this example, the line sampling-out control sections 24-1 to 24-8 sample out the 1920×1080/50P-60P signals which form the first to eighth sub-images for each line, thereby generating interlace signals (1920×1080/50I-60I signals) of two channels. The 1920×1080/50I-60I/4:4:4, 4:2:2, 4:2:0/10-bit, 12-bit signal is a signal defined by the SMPTE 274M.

Thereafter, the word sampling-out control sections 26-1 to 26-16 further sample out the signals for each word in a case where the signals having undergone the line sampling-out are signals of 10 bits or 12 bits of 4:4:4 or 12 bits of 4:2:2, and respectively transmit the signals with HD-SDIs of 1.5 Gbps of four channels. Here, the word sampling-out control sections 26-1 to 26-16 map the channels 1 and 2 including the 1920×1080/50I-60I signals to the Links A and B as follows.

Figure 10A:
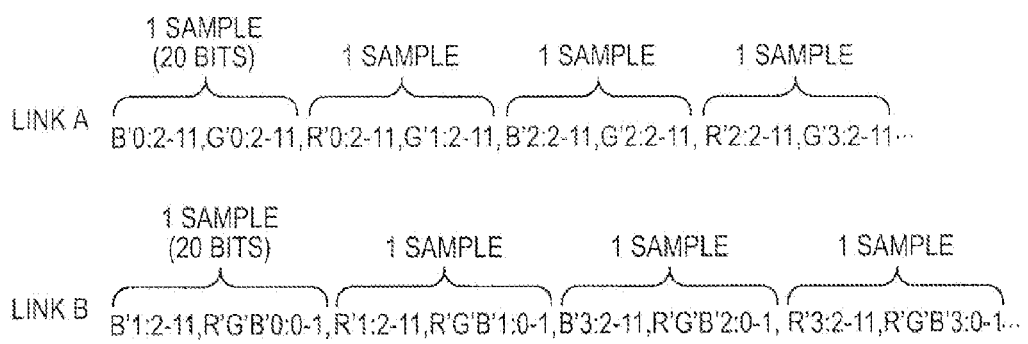
FIGS. 10A and 10B are diagrams illustrating examples of the data structures of the Link A and Link B by the SMPTE 372.
Figure 10B:
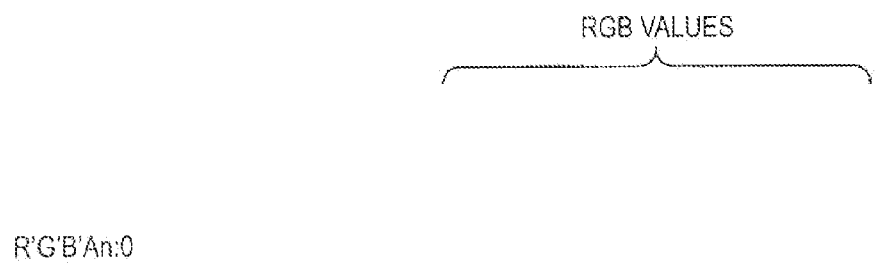

FIGS. 10A and 10B show an example of the data structure of the Links A and B by the SMPTE 372.

As shown in FIG. 10A, in the Link A, one sample has 20 bits, and all the bits indicate RGB values.

As shown in FIG. 10B, in the Link B as well, one sample has 20 bits, but only six bits of the bit numbers 2 to 7 of R'G'B'n:0 to 1 of 10 bits indicate RGB values. Therefore, the number of bits indicating RGB values in one sample is 16 bits.

In the case of 4:4:4, the word sampling-out control sections 26-1 to 26-16 perform mapping to the Links A and B (two HD-SDI channels) by the method described in FIGS. 4A to 4C (10 bits) or FIG. 6 (12 bits) of the SMPTE S372.

In the case of 4:2:2, the word sampling-out control sections 26-1 to 26-16 do not use the Link B and use only the channels CH1, CH3, CH5 and CH7.

Then, the readout control sections 28-1 to 28-32 multiplex the 3840×2160/100P-120P/4:4:4, 4:2:2, 4:2:0/10-bit, 12-bit signals into a transmission stream of 10.692 Gbps prescribed by the mode D of four channels and transmit the signals. As the multiplexing method, a method disclosed in JP-A-2008-099189 is used.

In this way, the mapping unit 11 generates the HD-SDIs of 32 channels from the first to eighth sub-images. In other words, the 3840×2160/100P-120P/4:4:4, 4:2:2, 4:2:0/10-bit, 12-bit signal can be transmitted with the HD-SDIs of 32 channels in total. In addition, in a case of a 4:2:2/10-bit signal, the signal is transmitted with HD-SDIs of 16 channels.

The HD-SDI signals of the channels CH1 to CH32 mapped by the mapping unit 11 are sent to the S/P, scramble and 8B/10B section 12 as shown in FIG. 2. In addition, the parallel digital data of 50-bit width to which 8-bit/10-bit encoding is applied is written in a FIFO memory (not shown) in response to a clock of 37.125 MHz received from the PLL 13. Thereafter, the data of 50-bit width is read out from the FIFO memory in response to a clock of 83:5312 MHz received from the PLL 13 and then is sent to a multiplexing section 14.

FIGS. 11A and 11B show an example where the multiplexing unit 14 performs a data multiplexing process.

FIG. 11A shows a form where each piece of scrambled data of 40 bits of CH1 to CH8 is multiplexed into data of 320-bit width in the changed order of each pair of the channels CH1 and CH2, the channels CH3 and CH4, the channels CH5 and CH6, and the channels CH7 and CH8.

FIG. 11B shows a form where 50-bit sample data obtained by 8B/10B conversion is multiplexed into four samples of 200-bit width.

As such, the data having undergone 8-bit/10-bit encoding is interposed between data to which self-synchronization scrambling is applied, every 40 bits. Thereby, it is possible to prevent occurrence of a pathological pattern by solving a variation in a mark ratio (ratio of 0 and 1) due to the scrambling method or instability in transition of 0 to 1 or 1 to 0.

In addition, the multiplexing unit 14 multiplexes the parallel digital data of CH1 having the 50-bit width only in the horizontal blanking period, read out from the FIFO memory in the S/P, scramble and 8B/10B section 12 into four samples to generate data of 200-bit width.

The parallel digital data of 320-bit width and the parallel digital data of 200-bit width multiplexed by the multiplexing unit 14 are sent to a data length conversion unit 15. The data length conversion unit 15 is formed using a shift register. The data length conversion unit 15 converts the parallel digital data of the 320-bit width is converted into data of 256-bit width, converts the parallel digital data of the 200-bit width into data of 256-bit width, and forms parallel digital data of the 256-bit width using the data. In addition, the data length conversion unit 15 converts the parallel digital data of the 256-bit width into data of 128-bit width.

Parallel digital data of the 64-bit width sent from the data length conversion unit 15 via a FIFO memory 16 is formed as serial digital data of 16 channels each of which has a bit rate of 668.25 Mbps, by a multi-channel data formation unit 17. The multi-channel data formation unit 17 is, for example, an XSBI (Ten gigabit Sixteen Bit Interface: a 16-bit interface used by a 10-Gigabit Ethernet (registered trademark) system). The serial digital data of 16 channels formed by the multi-channel data formation unit 17 is sent to a multiplexing and P/S conversion unit 18.

The multiplexing and P/S conversion unit 18 has a function as a parallel/serial conversion section, multiplexes the serial digital data of 16 channels received from the multi-channel data formation unit 17, and performs parallel/serial conversion for the multiplexed parallel digital data. Thereby, serial digital data of 668.25 Mbps×16=10.692 Gbps is generated.

The serial digital data having the bit rate of 10.692 Gbps generated by the multiplexing and P/S conversion unit 18 is sent to a photoelectric conversion unit 19. The photoelectric conversion unit 19 functions as an output section which outputs the serial digital data having the bit rate of 10.692 Gbps to the CCU 2. The photoelectric conversion unit 19 outputs a transmission stream of 10.692 Gbps which is multiplexed by the multiplexing unit 14. The serial digital data having the bit rate of 10.692 Gbps which is converted into an optical signal by the photoelectric conversion unit 19 is transmitted to the CCU 2 from the broadcasting cameras 1 via the optical fiber cable 3.

By the use of the broadcasting cameras 1 in this example, the 3840×2160/100P-120P/4:4:4, 4:2:2, 4:2:0/10-bit, 12-bit signal input from the image sensor can be transmitted as serial digital data. In the signal transmission apparatus and the signal transmission method in this example, the 3840×2160/100P-120P/4:4:4, 4:2:2, 4:2:0/10-bit, 12-bit signal is converted into HD-SDI signals of CH1 to CH32. Thereafter, the signals are output as serial digital data of 10.692 Gbps.

In addition, not only the 3840×2160/100P-120P/4:4:4, 4:2:2, 4:2:0/10-bit, 12-bit signal is sent to the CCU 2 but also the above-described return video (a video signal for causing a monitor of each broadcasting camera 1 to display images captured by the other broadcasting cameras 1) are sent from the CCU 2 to each of the broadcasting cameras 1 via the optical fiber cable 3. The return video is generated using a well-known technique (for example, HD-SDI signals of two channels respectively undergo 8-bit/10-bit encoding, and are converted into serial digital data through multiplexing), and thus description of a circuit configuration thereof will be omitted.

[Internal Configuration and Operation Example of CCU]

Next, an internal configuration example of the CCU 2 will be described.

FIG. 12 is a block diagram illustrating a portion related to the present embodiment in the circuit configuration of the CCU 2. The CCU 2 includes a plurality of such circuits having a one-to-one correspondence relationship with the broadcasting cameras 1.

Serial digital data having the bit rate of 10.692 Gbps transmitted from each broadcasting camera 1 through the optical fiber cable 3 is converted into an electric signal by a photoelectric conversion unit 31 and then sent to an S/P conversion multi-channel data formation unit 32. The S/P conversion multi-channel data formation unit 32 is, for example, an XSBI. The S/P conversion multi-channel data formation unit 32 receives the serial digital data having the bit rate of 10.692 Gbps.

The S/P conversion multi-channel data formation unit 32 performs serial/parallel conversion for the serial digital data having the bit rate of 10.692 Gbps. Then, the S/P conversion multi-channel data formation unit 32 forms serial digital data of 16 channels each having the bit rate of 668.25 Mbps and extracts a clock of 668.25 MHz from the parallel digital data obtained by the serial/parallel conversion.

The parallel digital data of 16 channels formed by the S/P conversion multi-channel data formation unit 32 is sent to a multiplexing unit 33. The clock of 668.25 MHz extracted by the S/P conversion multi-channel data formation unit 32 is sent to a PLL 34.

The multiplexing unit 33 multiplexes the serial digital data of 16 channels from the S/P conversion multi-channel data formation unit 32 to generate parallel digital data of the 64-bit width and sends the parallel digital data to a FIFO memory 35.

The PLL 34 divides the clock 668.25 MHz received from the S/P conversion multi-channel data formation unit 32 by four to generate a clock of 167.0625 MHz and sends the clock of 167.0625 MHz as a write clock to the FIFO memory 35.

Further, the PLL 34 divides the clock of 668.25 MHz from the S/P conversion multi-channel data formation unit 32 by eight to generate a clock of 83.5312 MHz and sends the clock of 83.5312 MHz as a read clock to the FIFO memory 35. In addition, the PLL 34 sends the clock of 83.5312 MHz as a write clock to a FIFO memory in a descramble, 8B/10B and P/S unit 38 described later.

Further, the PLL 34 divides the clock of 668.25 MHz received from the S/P conversion multi-channel data formation unit 32 by eighteen to generate a clock of 37.125 MHz and sends the clock of 37.125 MHz as a read clock to the FIFO memory in the descramble, 8B/10B and P/S unit 38. In addition, the PLL 34 sends the clock of 37.125 MHz as a write clock to the FIFO memory in the descramble, 8B/10B and P/S unit 38.

Further, the PLL 34 divides the clock of 668.25 MHz received from the S/P conversion multi-channel data formation unit 32 by nine to generate a clock of 74.25 MHz and sends the clock of 74.25 MHz as a read clock to the FIFO memory in the descramble, 8B/10B and P/S unit 38.

In the FIFO memory 35, parallel digital data of the 64-bit width received from the multiplexing unit 33 is written in response to the clock of 167.0625 MHz from the PLL 34. The parallel digital data written in the FIFO memory 35 is read out as parallel digital data of the 128-bit width in response to the clock of 83.5312 MHz received from the PLL 34 and is sent to a data length conversion unit 36.

The data length conversion unit 36 is formed using a shift register and converts the parallel digital data of the 128-bit width into parallel digital data of the 256-bit width. Then, the data length conversion unit 36 detects K28.5 inserted in the timing reference signal SAV or EAV. Thereby, the data length conversion unit 36 determines each line period and converts data of the timing reference signal SAV, the active line, the timing reference signal EAV, the line number LN, and the error detection code CRC into data of the 320-bit width. Further, the data length conversion unit 36 converts data of the horizontal auxiliary data space (the data of the horizontal auxiliary data space of the channel CH1 obtained by the 8B/10B encoding), into data of the 200-bit width. The parallel digital data of the 320-bit width and the parallel digital data of the 200-bit width obtained by the data length conversion by the data length conversion unit 36 are sent to a demultiplexing unit 37.

The demultiplexing unit 37 demultiplexes parallel digital data of the 320-bit width from the data length conversion unit 36 into data of the channels CH1 to CH32 each of which has 90 bits before they are multiplexed by the multiplexing unit 14 in the broadcasting camera 1. The parallel digital data includes data of the timing reference signal SAV, the active line, the timing reference signal EAV, the line number LN, and the error detection code CRC. The parallel digital data of the 40-bit width of the channels CH1 to CH32 are sent to the descramble, 8B/10B and P/S unit 38.

Further, the demultiplexing unit 37 demultiplexes parallel digital data of the 200-bit width received from the data length conversion unit 36 into data of 50 bits before they are multiplexed by the multiplexing unit 14. The parallel digital data includes data of the horizontal auxiliary data space of the channel CH1 in the form encoded by 8B/10B encoding. Then, the demultiplexing unit 37 sends parallel digital data of the 50-bit width to the descramble, 8B/10B and P/S unit 38.

The descramble, 8B/10B and P/S unit 38 is formed by 32 blocks having a one-to-one correspondence relationship with the channels CH1 to CH32. The descramble, 8B/10B and P/S unit 38 in this example functions as a reception section for receiving first to eighth sub-images to which a video signal is mapped and each of which is divided into a first link channel and a second link channel and further divided into two lines.

The descramble, 8B/10B and P/S unit 38 includes blocks for the channels CH1, CH3, CH5, CH7, . . . , and CH31 of the Link A, and descrambles parallel digital data input thereto to convert them into serial digital data and outputs the serial digital data.

The descramble, 8B/10B and P/S unit 38 further includes blocks for the channels CH2, CH4, CH6, CH8, . . . , and CH32 of the Link B, and decodes parallel digital data input thereto by 8B/10B decoding. Then, the descramble, 8B/10B and P/S unit 38 converts resulting data into serial digital data and outputs the serial digital data.

A reproduction unit 39 performs a process reverse to the process of the mapping unit 11 in the broadcasting camera 1 in accordance with the SMPTE 435 for HD-SDI signals of the channels' CH1 to CH32 (Link A and Link B) sent from the descramble, 8B/10B and P/S unit 38. By this process, the reproduction unit 39 reproduces a 3840×2160/100P-120P/4:4:4, 4:2:2, 4:2:0/10-bit, 12-bit signal.

At this time, the reproduction unit 39 reproduces the first to eighth sub-images from the HD-SDIs 1 to 32 received by the S/P conversion multi-channel data formation unit 32 by sequentially performing the word multiplexing, line multiplexing and vertical rectangular region multiplexing processes. Then, the reproduction unit 39 reads out pixel samples disposed in the video data regions of the first to eighth sub-images for each line in a unit of 480 pixel samples, and sequentially multiplexes the read-out pixel samples into the first and second UHDTV1 class images which are two consecutive frames in the line direction.

The 3840×2160/100P-120P/4:4:4, 4:2:2, 4:2:0/10-bit, 12-bit signal reproduced by the reproduction unit 39 is output from the CCU 2 and is sent, for example, to a VTR (not shown) or the like.

In this example, the CCU 2 carries out signal processing on the side which receives serial digital data generated by the broadcasting cameras 1. In the signal reception apparatus and the signal reception method, parallel digital data is generated from the serial digital data having the bit rate of 10.692 Gbps, and the parallel digital data is demultiplexed into data of the individual channels of the Link A and Link B.

The self-synchronization descrambling may be applied to the demultiplexed data of the Link A, but, immediately prior to the timing reference signal SAV, all of the values of registers in a descrambler are set to 0 to start decoding. Further, the self-synchronization descrambling may also be applied to data of at least several bits following the error detection code CRC. Thereby, the self-synchronization scrambling may be applied only to data of the timing reference signal SAV, the active line, the timing reference signal EAV, the line number LN, and the error detection code CRC. For this reason, although the self-synchronization scrambling is not applied to the data of the horizontal auxiliary data space, it is possible to perform accurate calculation taking carry of the descrambler as a multiplication circuit into consideration to reproduce original data.

Meanwhile, with regard to the demultiplexed data of the Link B, sample data of the Link B is formed from the bits of RGB obtained by 8 bits/10 bits decoding. Then, the parallel digital data of the Link A to which the self-synchronization descrambling is applied and the parallel digital data of the Link B from which the samples are formed respectively undergo parallel/serial conversion. Then, mapped HD-SDI signals of the channels CH1 to CH32 are reproduced.

Figure 13:
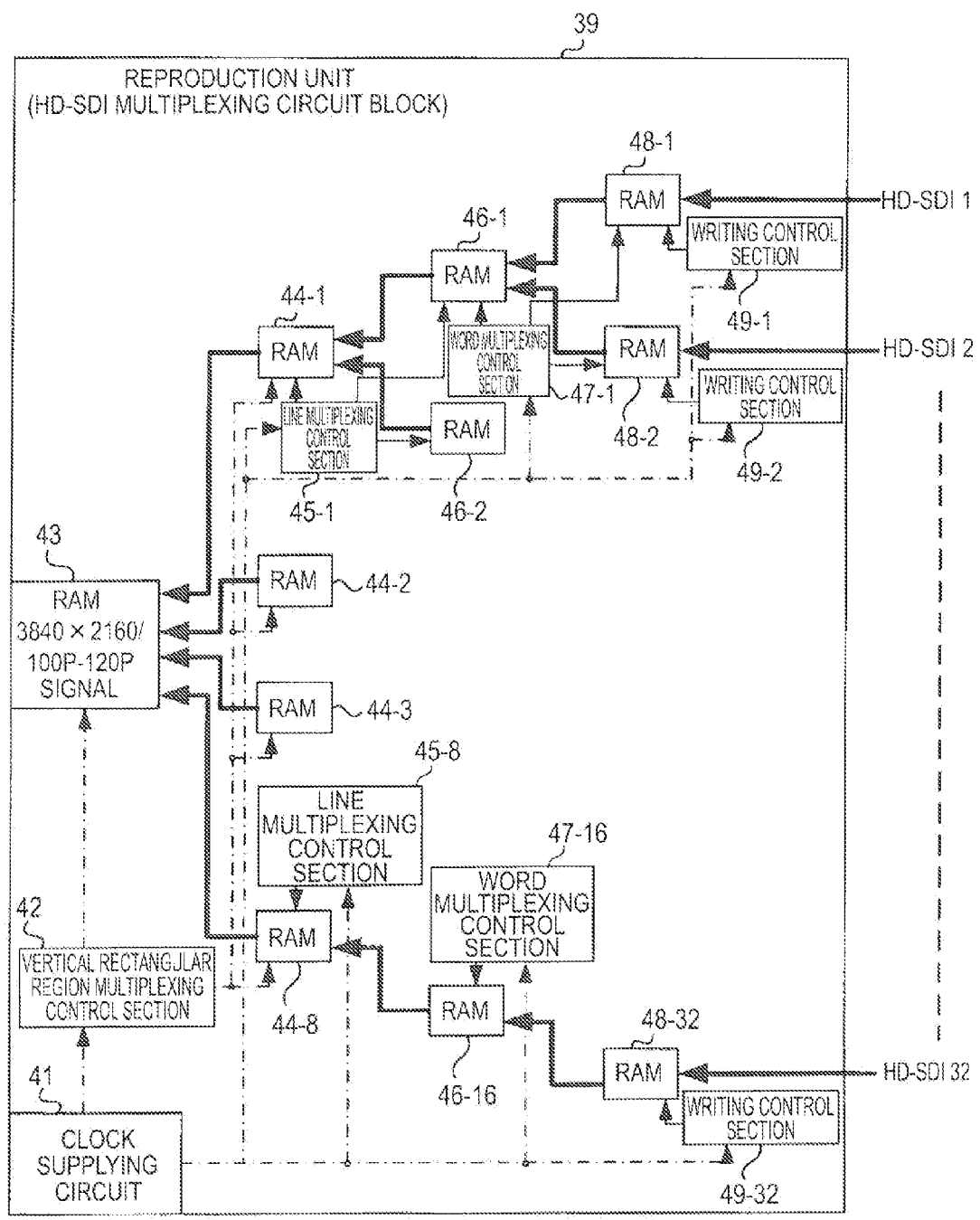
FIG. 13 is a block diagram illustrating an internal configuration example of the reproduction unit according to the first embodiment of the present disclosure.

FIG. 13 shows an example of an internal configuration of the reproduction unit 39.

The reproduction unit 39 is a block for carrying out reverse conversion to the process performed for pixel samples by the mapping unit 11.

The reproduction unit 39 includes a clock supplying circuit 41 for supplying clocks to associated blocks. The clock supplying circuit 41 supplies a clock to a vertical rectangular region multiplexing control section 42, line multiplexing control sections 45-1 to 45-8, word multiplexing control sections 47-1 to 47-16, and writing control sections 49-1 to 49-32. The respective sections are synchronized with each other by the clock so that reading out or writing of pixel samples is controlled.

The reproduction unit 39 further includes RAMs 48-1 to 48-32 for storing 32 HD-SDIs 1 to 32 of the mode D prescribed by the SMPTE 435-2, respectively. The HD-SDIs 1 to 32 form 1920×1080/50I-60I signals as described above. For the HD-SDIs 1 to 32, the channels CH1, CH3, CH5, and CH31 of the Link A input from the descramble, 8B/10B and P/S unit 38 and channels CH2, CH4, CH6, and CH32 of the Link B of the descramble, 8B/10B and P/S unit 38 are used.

The writing control sections 49-1 to 49-32 perform a writing control for storing the input 32 HD-SDIs 1 to 32 in the RAMs 48-1 to 48-32 in response to a clock supplied from the clock supplying circuit 41.

The reproduction unit 39 further includes the word multiplexing control sections 47-1 to 47-16 which controls word multiplexing (deinterleave), and RAMs 46-1 to 46-16 in which data multiplexed by the word multiplexing control sections 47-1 to 47-16 is written. In addition, the reproduction unit 39 includes line multiplexing control sections 45-1 to 45-8 which controls line multiplexing, and RAMs 44-1 to 44-8 in which data multiplexed by the line multiplexing control sections 45-1 to 45-8 is written.

The word multiplexing control sections 47-1 to 47-16 multiplex pixel samples extracted from video data regions of the 10.692 Gbps stream defined by the mode D of four channels which is prescribed by the SMPTE 435-2 and corresponds to each of the first to eighth sub-images, for each line. The word multiplexing control sections 47-1 to 47-16 multiplex pixel samples extracted from the video data regions of the HD-SDIs read out from the RAMs 48-1 to 48-32 for each line where words are inversely converted according to the FIGS. 4A to 4C, 6, 7, 8 and 9 of the SMPTE 372. Specifically, the word multiplexing control sections 47-1 to 47-16 control the timing for each of the RAMs 48-1 and 48-2, the RAMs 48-3 and the RAMs 48-31 and 48-32, thereby multiplexing the pixel sample. Then, the word multiplexing control sections 47-1 to 47-16 generate and store 1920×1080/50I-60I/4:4:4, 4:2:2, 4:2:0/10-bit, 12-bit signals in the RAMs 46-1 to 46-16.

The line multiplexing control sections 45-1 to 45-8 multiplex for each sub-image the pixel samples read out from the RAMs 46-1 to 46-16 and multiplexed for each line to generate a progressive signal. Then, the line multiplexing control sections 45-1 to 45-8 generate and store 1920×1080/50P-60P/4:4:4, 4:2:2, 4:2:0/10-bit, 12-bit signals in the RAMs 44-1 to 44-8, respectively. The signals stored in the RAMs 44-1 to 44-8 configure the first to eighth sub-images.

The vertical rectangular region multiplexing control section 42 maps the pixel samples extracted from the video data regions of the first to eighth sub-images to the consecutive first and second UHDTV1 class images. In The first to eighth sub-image, m'×n' is 1920×1080, a'–b' is 50P, 59.94P, 60P, r':g':b' is 4:4:4, 4:2:2, 4:2:0. At this time, the vertical rectangular region multiplexing control section 42 multiplexes 480 pixel samples read out from the RAMs 44-1 to 44-8 for each line into the UHDTV1 class image. In addition, the vertical rectangular region multiplexing control section 42 first reads out the pixel samples for each line from the first half parts of the first to eighth sub-images, reads out all the pixel samples from the first half parts, and then reads out the pixel samples for each line from the second half parts of the first to eighth sub-images. The pixel samples are multiplexed into the UHDTV1 class image together. The class image is a 3840×2160/100P-120P/4:4:4, 4:2:2, 4:2:0/10-bit, 12-bit signal.

In addition, the vertical rectangular region multiplexing control section 42 acquires t vertical rectangular regions by dividing the first and second class images into t (t=m/p) by p (where p is an integer equal to or more than 1) pixel samples in the horizontal direction. Then, the vertical rectangular region multiplexing control section 42 multiplexes pixel samples read out from each line of the video data regions of the first to t-th sub-images in the horizontal direction in a unit of p pixel samples into the first to t-th video data regions from the 0th line to the (n−1)-th line of the first and second class images. In addition, the vertical rectangular region multiplexing control section 42 reads out pixel samples from each line of the video data regions of the first to t-th sub-images in a unit of p pixel samples m'/p times and multiplexes the pixel samples. At this time, pixel samples are repeatedly read out from the next line which is vertically subsequent to the line from which the pixel samples have been read out in the first and second class images, in a unit of p pixel samples, and are multiplexed.

At this time, the vertical rectangular region multiplexing control section 42 defines a line of the UHDTV1 class image using the consecutive 0th line, first line, second line, and third line, and performs the following process for the consecutive first and second class images. In other words, the vertical rectangular region multiplexing control section 42 sequentially multiplexes 480 pixel samples read out from the video data region of the first sub-image in the line direction into the 0th to third lines in the first vertical rectangular region of the first class image. 480 pixel samples are multiplexed until pixel samples are read out from all the lines of the video data region of the first sub-image after the fourth line in the first vertical rectangular region. In a case where the first vertical rectangular region in the first class image is filled with the pixel samples in the course of multiplexing the pixel samples, the pixel samples are multiplexed into the first vertical rectangular region in the second class image.

Thereafter, the vertical rectangular region multiplexing control section 42 sequentially multiplexes 480 pixel samples readout from the video data region of the second sub-image in the line direction into the 0th to third lines in the second vertical rectangular region of the first class image. The same process as in the case of multiplexing the pixel samples of the first sub-image is performed for pixel samples read out from the video data region of the second sub-image. Hereinafter, pixel samples are sequentially multiplexed into the first and second class images up to the eighth sub-image. A 3840×2160/100P-120P signal is preserved in the consecutive first and second frames prescribed by the UHDTV1 class image in the RAM 43, and this signal is appropriately reproduced.

Further, FIG. 13 shows an example where vertical rectangular region multiplexing, line multiplexing, and word multiplexing are carried out at three different stages using three different kinds of RAMs. However, a single RAM may be used to reproduce a 3840×2160/100P-120P/4:4:4, 4:2:2, 4:2:0/10-bit, 12-bit signal.

The above-described mapping unit 11 of the broadcasting camera 1 according to the first embodiment maps the 3840×2160/100P-120P signal having a large number of pixels prescribed by the UHDTV1 class image to the first to eighth sub-images. The mapping process is performed by sampling out pixel samples in a unit of 480 pixel samples every two consecutive frames. The sampled-out pixel samples are mapped to the first to eighth sub-images. Thereafter, HD-SDIs are output through the line sampling-out and the word sampling-out. The sampling-out process is a method of a minimizing a memory capacity necessary for mapping signals, and can suppress signal transmission delay to the minimum since the memory capacity is minimized.

On the other hand, the reproduction unit 39 of the CCU 2 receives HD-SDIs of 32 channels, performs word sampling-out and line sampling-out, and multiplexes pixel samples into the first to eighth sub-images. Then, 480 pixel samples extracted from the first to eighth sub-images are multiplexed into 3840×2160 having a large number of pixels prescribed by the UHDTV1 class image of two consecutive frames. In this way, it is possible to transmit and receive the pixel, samples prescribed by the UHDTV1 class image using the HD-SDI format in the related art.

2. Second Embodiment

Example of UHDTV2 7680×4320/100P, 119.88, 120P/4:4:4, 4:2:2, 4:2:0/10 Bits, 12 Bits Next, an example of the operation of the mapping unit 11 and the reproduction unit 39 according to the second embodiment of the present disclosure is described with reference to FIGS. 14 to 16.

Here, a method of sampling out pixel samples of a 7680×4320/100P-120P/4:4:4, 4:2:2, 4:2:0/10-bit, 12-bit signal is described.

Figure 14:
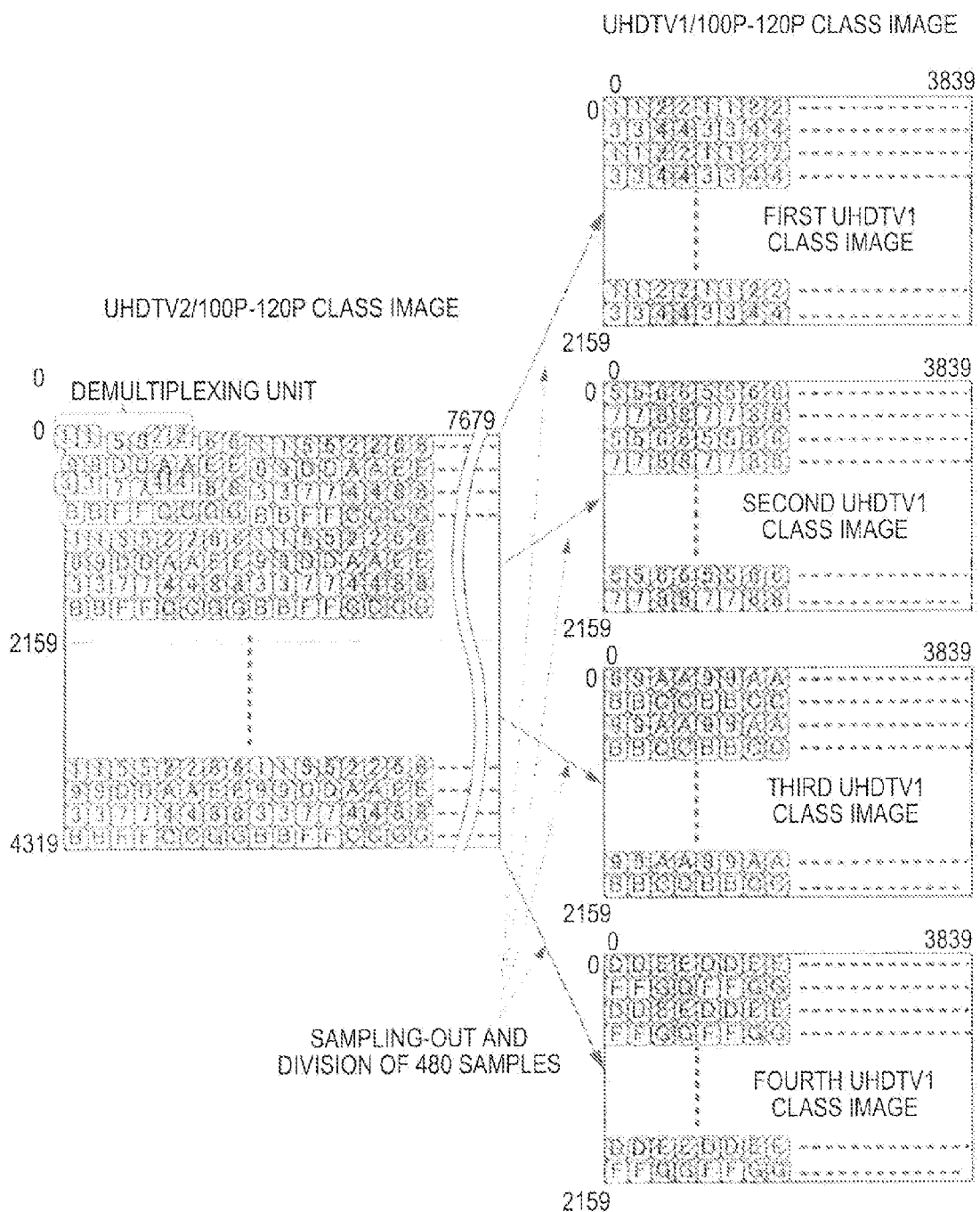
FIG. 14 is a diagram illustrating a processing example where a mapping section according to a second embodiment of the present disclosure maps pixel samples included in the UHDTV2 class image to the UHDTV1 class image.

FIG. 14 shows a processing example where the mapping unit 11 maps pixel samples included in the UHDTV2 class image to the UHDTV1 class image.

In this example, a 7680×4320/100P-120P/4:4:4, 4:2:2, 4:2:0/10-bit, 12-bit signal prescribed as the UHDTV2 class image which repeats the 0th to third lines is input to the mapping unit 11. The 7680×4320/100P-120P/4:4:4, 4:2:2, 4:2:0/10-bit, 12-bit signal has a frame rate equal to twice that of a signal prescribed by the S2036-1. The signal prescribed by the S2036-1 is a 7680×4320/50P-60P/4:4:4, 4:2:2, 4:2:0/10-bit, 12-bit signal. Further, the 7680×4320/100P-120P signal and the 7680×4320/50P-60P signal are the same in the digital signal format such as an inhibition code.

The mapping unit 11 maps the 7680×4320/100P-120P/4:4:4, 4:2:2, 4:2:0/10-bit, 12-bit signal to a class image prescribed by the UHDTV1. This class image is a 3840×2160/100P-120P/4:4:4, 4:2:2, 4:2:0/10-bit, 12-bit signal.

The mapping unit 11 maps pixel samples every two pixel samples in a unit of two lines from the UHDTV2 class image to the first to fourth UHDTV1 class images as prescribed in the S2036-3. That is to say, the 7680×4320/100P-120P/4:4:4, 4:2:2, 4:2:0/10-bit, 12-bit signal is sampled out every two pixel samples in a unit of two lines in the horizontal direction. In addition, the pixel samples are mapped to 3840×2160/100P-120P/4:4:4, 4:2:2, 4:2:0/10-bit, 12-bit signals of four channels. The 3840×2160/100P-120P/4:4:4, 4:2:2, 4:2:0/10-bit, 12-bit signals of four channels can be transmitted in the mode D of 10.692 Gbps of four channels by such a method as described in the first embodiment. Therefore, the signals can be transmitted in the mode D of 10.692 Gbps of 16 (=4×4) channels in total.

Figure 15:
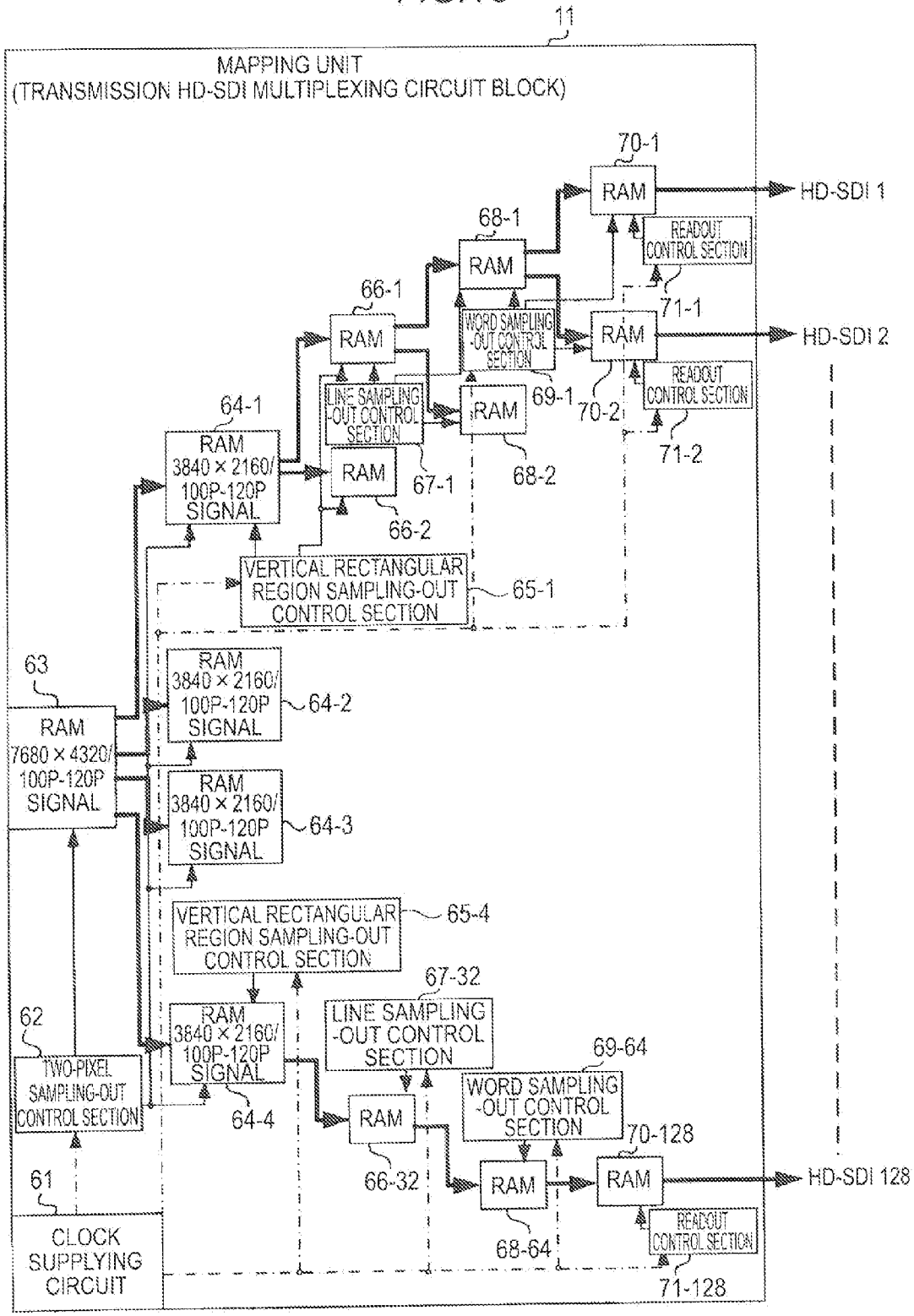
FIG. 15 is a block diagram illustrating an internal configuration example of the mapping section according to the second embodiment of the present disclosure.

FIG. 15 shows an internal configuration example of the mapping unit 11.

The mapping unit 11 includes a clock supplying circuit 61 which supplies a clock to components of the mapping unit 11, and a RAM 63 which stores a 7680×4320/100P-120P video signal. Further, the mapping unit 11 includes a two-pixel sampling-out (interleave) control section 62 which controls two-pixel sampling-out (interleave) for reading out two pixel samples from the 7680×4320/100P-120P video signal, which is the UHDTV2 class image, stored in the RAM 63. In addition, the pixel samples obtained by the two-pixel sampling-out to the UHDTV1 class image are stored in RAMs 64-1 to 64-4. The pixel samples are stored as first to fourth class images of the 3840×2160/100P-120P/4:4:4, 4:2:2, 4:2:0/10-bit, 12-bit signal prescribed by the UHDTV1.

The mapping unit 11 includes vertical rectangular region sampling-out sections 65-1 to 65-4 which control vertical rectangular region sampling-out of reading out pixel samples from the first to fourth class images read out from the RAMs 64-1 to 64-4, respectively. The vertical rectangular region sampling-out sections 65-1 to 65-4 read out pixel samples every two consecutive frames for each line in a unit of 480 pixel samples. An operation where the vertical rectangular region sampling-out sections 65-1 to 65-4 map pixel samples to the sub-images is similar to the operation of the vertical rectangular region sampling-out control section 21 according to the first embodiment described above. The pixel samples obtained by the vertical rectangular region sampling-out are stored as first to eighth sub-images in RAMs 66-1 to 66-32 for each of the first to fourth class images.

The mapping unit 11 further includes line sampling-out control sections 67-1 to 67-32 which control line sampling-out of data read out from the RAMs 66-1 to 66-32, and RAMs 68-1 to 68-64 in which data sampled out by the line sampling-out control sections 67-1 to 67-32 is written.

The mapping unit 11 further includes word sampling-out control section 69-1 to 69-64 which control word sampling-out of data readout from the RAMs 68-1 to 68-64. The mapping unit 11 further includes RAMs 70-1 to 70-128 in which data sampled out by the word sampling-out control sections 69-1 to 69-64 is written. The mapping unit 11 further includes readout control sections 71-1 to 71-128 which output pixel samples of data read out from the RAMs 70-1 to 70-128 as HD-SDIs of 128 channels.

Although FIG. 15 shows the blocks for generating the HD-SDI 1, also the blocks for generating the HD-SDIs 2 to 128 have a similar configuration, and therefore, illustration and detailed description of the blocks will be omitted.

Next, an operation example of the mapping unit 11 will be described.

The clock supplying circuit 61 supplies a clock to the two-pixel sampling-out control section 62, the vertical rectangular region sampling-out sections 65-1 to 65-4, the line sampling-out control sections 67-1 to 67-32, the word sampling-out control sections 68-1 to 68-64, and the readout control sections 71-1 to 71-128. This clock is used for reading out or writing of pixel samples, and the blocks are synchronized with each other by the clock.

A class image prescribed by a 7680×4320/100P-120P/4:4:4, 4:2:2, 4:2:0/10-bit, 12-bit signal of the UHDTV2 input from an image sensor (not shown) is stored in the RAM 63.

The two-pixel sampling-out control section 62 maps two pixel samples adjacent to each other on the same line for each line of four consecutive lines from the UHDTV2 class image to the first to fourth UHDTV1 class images. At this time, the respective pixel samples included every other line from the 0th line of the UHDTV2 class image are mapped to the same line of the first UHDTV1 class image every two other pixel samples for each line. Next, the respective pixel samples which are included every other line from the 0th line of the UHDTV2 class image and are different from the pixel samples mapped to the first UHDTV1 class image are mapped. This mapping process is performed on the same line of the second UHDTV1 class image every two other pixel samples. Next, the respective pixel samples included every other line from the first line of the UHDTV2 class image are mapped to the same line of the third UHDTV1 class image every two other pixel samples for each line. Next, the respective pixel samples which are included every other line from the first line of the UHDTV2 class image and are different from the pixel samples mapped to the third UHDTV1 class image are mapped. This mapping process is performed to the same line of the fourth UHDTV1 class image every two other pixel samples. The mapping process is repeatedly performed until all the pixel samples of the UHDTV2 class image are extracted.

In addition, FIG. 14 shows an example where four consecutive lines are read out from the UHDTV2 class image at one time, and are mapped to the first to fourth UHDTV1 class images. However, two consecutive lines may be read out from the UHDTV2 class image, and pixel samples included in each line may be mapped to the first and second UHDTV1 class images, or the third and fourth UHDTV1 class images.

A process where the vertical rectangular region sampling-out sections 65-1 to 65-4 map pixel samples to the first to eighth sub-images, a line sampling-out process, and a word sampling-out process are similar to the sampling-out processes of pixel samples according to the first embodiment, and thus detailed description thereof will be omitted.

Figure 16:
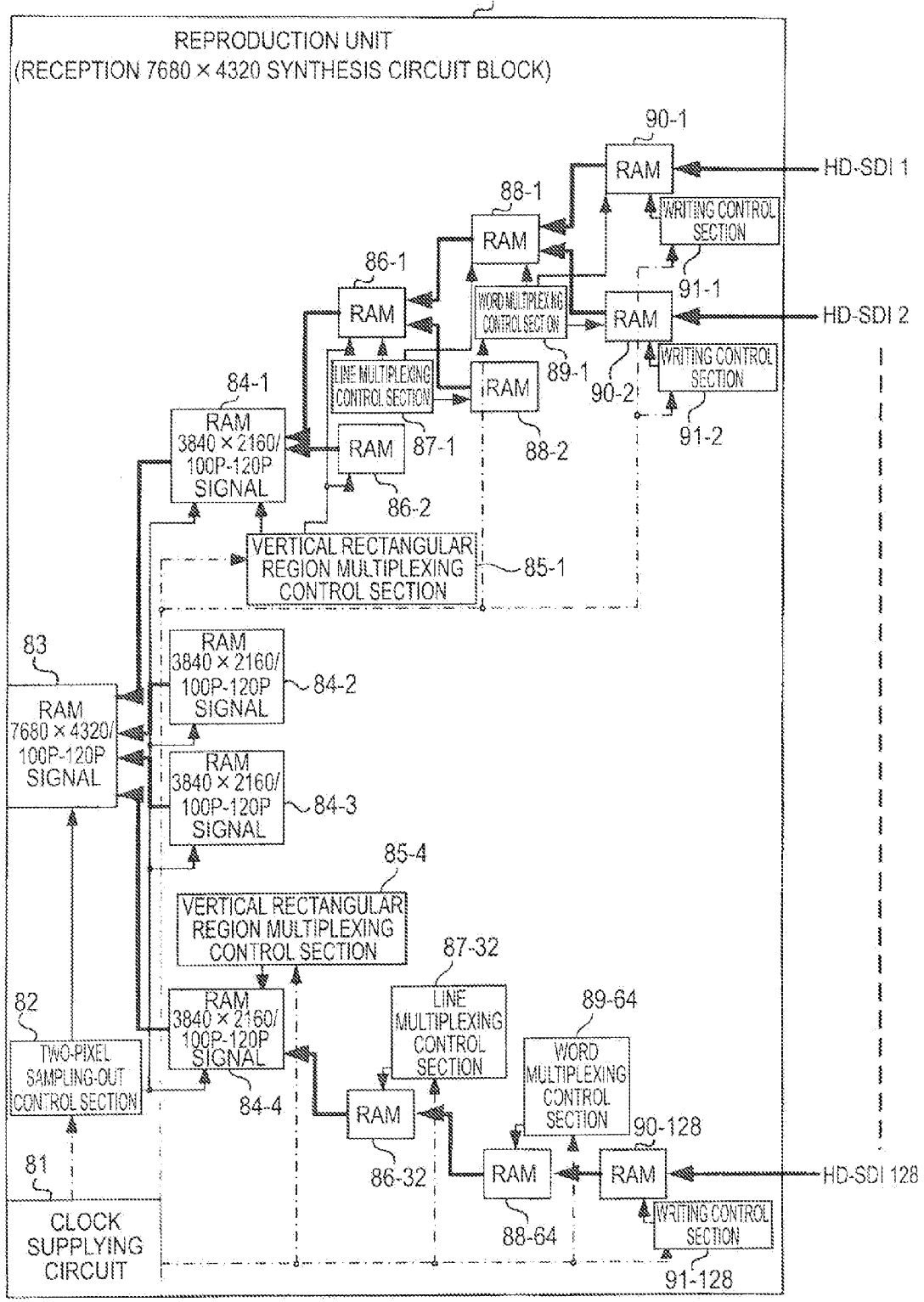
FIG. 16 is a block diagram illustrating an internal configuration example of the reproduction unit according to the second embodiment of the present disclosure.

FIG. 16 shows an internal configuration example of the reproduction unit 39.

The reproduction unit 39 is a block for performing reverse conversion for the process which has been performed for pixel samples by the mapping unit 11.

The reproduction unit 39 includes a clock supplying circuit 81 which supplies a clock to the components of the reproduction unit 39. The reproduction unit 39 further includes RAMs 90-1 to 90-128 which respectively store 128 HD-SDIs 1 to 128 which configure 1920×1080/50I-60I signals. For the HD-SDIs 1 to 128, the channels CH1, CH3, CH5, CH7, . . . , and CH127 of the Link A and the channels CH2, CH4, CH6, CH8, . . . , and CH128 of the Link B input from the descramble, 8B/10B and P/S unit 38 are used. Writing control sections 91-1 to 91-128 perform a control for writing the 128 HD-SDIs 1 to 128 prescribed by the SMPTE 435-2 and input thereto in the RAMs 90-1 to 90-128 in response to a clock supplied from the clock supplying circuit 81.

The reproduction unit 39 further includes word multiplexing control sections 89-1 to 89-64 for controlling word multiplexing (deinterleave), and RAMs 88-1 to 88-64 in which data multiplexed by the word multiplexing control sections 89-1 to 89-64 is written. The reproduction unit 39 further includes line multiplexing control sections 87-1 to 87-32 for controlling line multiplexing, and RAMs 86-1 to 86-32 in which data multiplexed by the line multiplexing control sections 87-1 to 87-32 is written.

In addition, the reproduction unit 39 includes vertical rectangular region multiplexing control sections 85-1 to 85-4 which controls multiplexing of 480 pixel samples extracted from the RAMs 86-1 to 86-32. The reproduction unit 39 further includes RAMs 84-1 to 84-4 which store pixel samples which the vertical rectangular region multiplexing control sections 85-1 to 85-4 have multiplexed into the UHDTV1 class image. In addition, the reproduction unit 39 includes a two-pixel multiplexing control section 82 which multiplexes pixel samples of the UHDTV1 class image extracted from the RAMs 84-1 to 84-4 into the UHDTV2 class image. The reproduction unit 39 further includes a RAM 83 which stores pixel samples which have been multiplexed into the UHDTV2 class image.

Next, an operation example of the reproduction unit 39 will be described.

The clock supplying circuit 81 supplies a clock to the second two-pixel multiplexing control section 82, the vertical rectangular region multiplexing control sections 85-1 to 85-4, the line multiplexing control sections 87-1 to 87-32, the word multiplexing control sections 89-1 to 89-64, and the writing control sections 91-1 to 91-128. By this clock, reading-out or writing of pixel samples is controlled by the blocks synchronized with each other.

A process where pixel samples extracted from the first to eighth sub-images are mapped to the UHDTV1 class image, a line multiplexing process, and a word multiplexing process are similar to the multiplexing processes of pixel samples according to the first embodiment, and thus detailed description thereof will be omitted.

The two-pixel multiplexing control section 82 multiplexes pixel samples from the RAMs 84-1 to 84-4 every two pixel samples through the following processes. That is to say, the two-pixel multiplexing control section 82 multiplexes pixel samples extracted from the first to fourth UHDTV1 class images into positions of two pixel samples adjacent to each other on the same line for each line of four consecutive lines of the UHDTV2 class image. At this time, pixel samples extracted every two pixel samples for each line from the same line of the first UHDTV1 class image are multiplexed into lines every other line from the 0th line of the UHDTV2 class image and every two other pixel samples on the same line. Next, pixel samples extracted every two pixel samples for each line from the same line of the second UHDTV1 class image are multiplexed. This multiplexing process is performed every other line from the 0th line of the UHDTV2 class image and every two other pixel samples on the same line at positions different from those of the pixel samples multiplexed from the first UHDTV1 class image. Next, pixel samples extracted every two pixel samples for each line from the same line of the third UHDTV1 class image are multiplexed into lines every other line from the first line of the UHDTV2 class image and every two other pixel samples on the same line. Next, pixel samples extracted every two pixel samples for each line from the same line of the fourth UHDTV1 class image are multiplexed. This multiplexing process is performed every other line from the first line of the UHDTV2 class image and every two other pixel samples on the same line at positions different from those of the pixel samples multiplexed from the third UHDTV1 class image. Further, this multiplexing process is repeatedly performed until all the pixel samples of the UHDTV1 class images are extracted.

As a result, the 7680×4320/100P-120P/4:4:4, 4:2:2, 4:2:0/ 10-bit, 12-bit signal which is a class image prescribed by the UHDTV2 is stored in the RAM 83, and this signal is appropriately sent to the VTR or the like so as to be reproduced.

FIG. 16 shows an example where two-pixel multiplexing, vertical rectangular region multiplexing, line multiplexing, and word multiplexing are performed at four stages using four different types of RAMS. However, a single RAM may be used to reproduce a 7680×4320/100P, 119.88P, 120P/4:4:4, 4:2:2, 4:2:0/10-bit, 12 bit signal.

The broadcasting cameras 1 according to the second embodiment described above perform the following sampling-out process. That is to say, a 7680×4320 signal having a large number of pixels is sampled out twice in a unit of two pixel samples so as to be mapped to a plurality of 1920×1080 signals, and then line sampling-out is performed. This sampling-out process minimizes the memory capacity necessary to map a signal and can suppress the signal transmission delay to the minimum level since the memory capacity is minimized.

In addition, the CCU 2 according to the second embodiment performs the word multiplexing, the line multiplexing, the vertical rectangular region multiplexing, the two-pixel multiplexing based on 128 HD-SDIs received from the broadcasting cameras 1, thereby generating the UHDTV1 class image. Further, the UHDTV2 class image is generated from the UHDTV1 class image, and thereby the UHDTV2 class image can be transmitted to the broadcasting cameras 1 using the existing transmission interfaces.

In addition, when 10G signals of 16 channels are transmitted through a single optical fiber, the CWDM/DWDM wavelength multiplexing technique can be used.

3. Third Embodiment

Example of 3840×2160/(50P-60P)×N/4:4:4, 4:2:2, 4:2:0/10 Bits, 12 Bits

Next, an operation example of the mapping unit 11 and the reproduction unit 39 according to the third embodiment of the present disclosure will be described with reference to FIG. 17.

Figure 17:
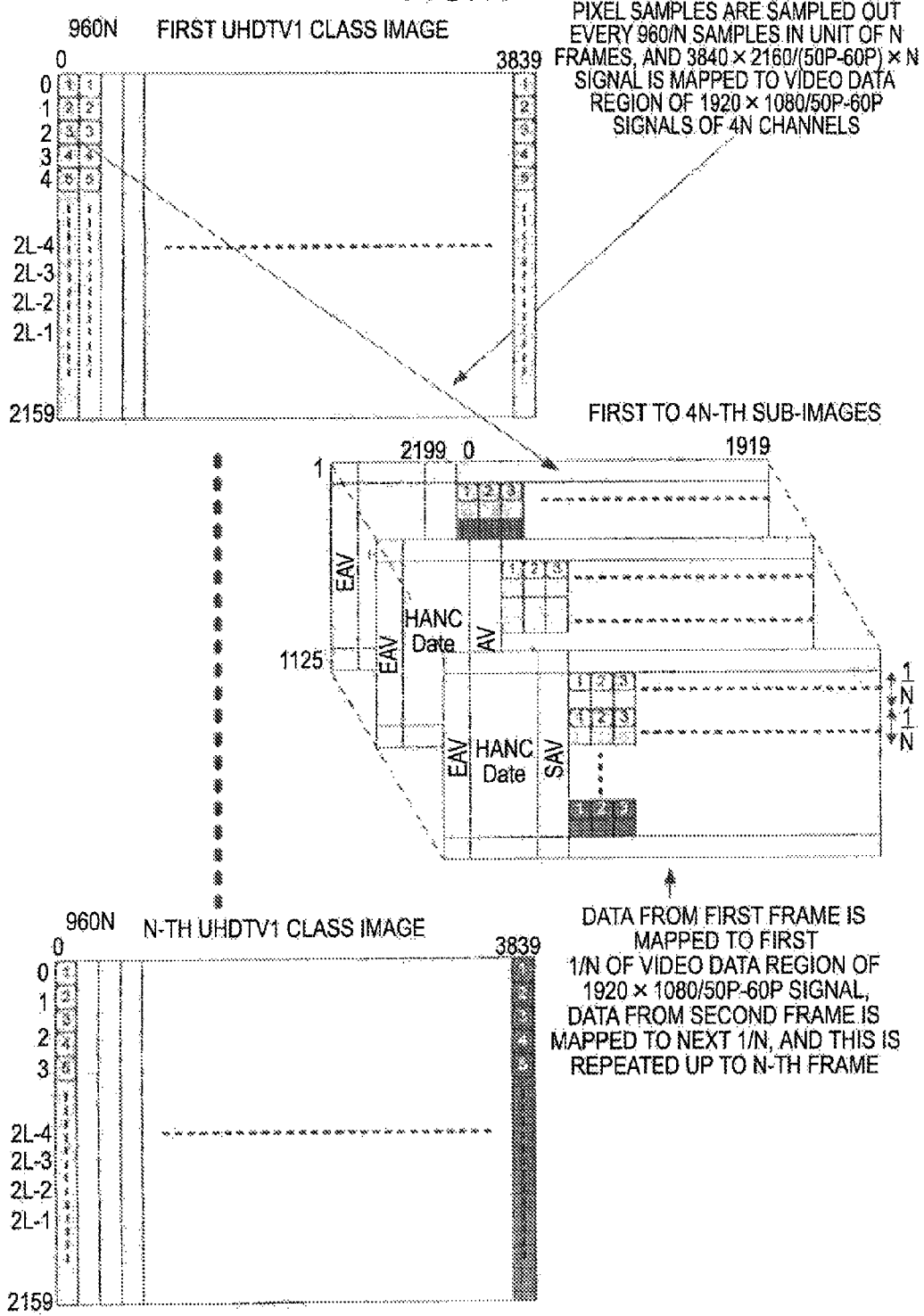
FIG. 17 is a diagram illustrating a processing example where a mapping section according to a third embodiment of the present disclosure maps pixel samples included in the UHDTV1 class image to first to 4N-th sub-images.

FIG. 17 shows an processing example where the mapping unit 11 maps pixel samples included in consecutive first to N-th UHDTV1 class images to first to 4N-th (where N is an integer equal to or more than 2) sub-images. The consecutive first to N-th UHDTV1 class images (consecutive first to N-th frames) including first and second class images have m×n of 3840×2160. In addition, a–b is (50P, 59.94P, 60P)×N, and r:g:b is 4:4:4, 4:2:2, 4:2:0. Further, the number of lines of the first to N-th UHDTV1 class images is prescribed as 0, 1, . . . , 2L−4, 2L−3, 2L−2, . . . , and 2159 (where L is an integer). Since N is an integer equal to or more than 2, (50P-60P)×N indicates a video signal substantially having a frame rate equal to or higher than 100P-120P.

At this time, the mapping unit 11 maps pixel samples included in vertical rectangular regions prescribed in the UHDTV1 class image to video data regions of first to t-th sub-images where t=4N, every n'/2N pixel samples. In addition, in the following description, the first to t-th sub-images will be described as first to 4N-th sub-images. In the first to 4N-th video data regions, m'×n' is 1920×1080, a'–b' is 50P, 59.94P, 60P, r':g':b' is 4:4:4, 4:2:2, 4:2:0.

A 3840×2160/(50P-60P)×N/4:4:4, 4:2:2, 4:2:0/10-bit, 12-bit signal has a frame rate equal to N times that of the 3840×2160/50P-60P/4:4:4, 4:2:2, 4:2:0/10-bit, 12-bit signal prescribed by the S2036-1. However, the two are different in colorimetry, but digital signal formats such as an inhibition code are the same.

In a video data region of the mapped 1920×1080/50P-60P signal, a signal of the first frame of the 3840×2160/100P-120P/4:4:4, 4:2:2, 4:2:0/10-bit, 12-bit signal is mapped in a 1/N part. In addition, a signal of the next frame is mapped to the next 1/N part, and, thereafter, the mapping process is repeatedly performed until the video data regions of the first to 4N-th sub-images are filled with pixel samples.

Here, the mapping unit 11 samples out pixel samples of the 3840×2160/(50P-60P)×N/4:4:4, 4:2:2, 4:2:0/10-bit, 12-bit signal as follows. That is to say, the mapping unit 11 sequentially extracts pixel samples every 960/N pixel samples from each line of the video data regions in the UHDTV1 class images of a unit of N consecutive frames. Then, the 3840×2160/100P-120P/4:4:4, 4:2:2, 4:2:0/10-bit, 12-bit signal is multiplexed into 2N lines. This mapping process is performed to 1/N, the next 1/N . . . video data regions from the above of the first to 4N-th sub-images every n'/2N pixel samples (in this example, 960/N pixel samples). Thereby, the pixel samples can be mapped to 1920×1080/50P-60P/4:4:4, 4:2:2, 4:2:0/10-bit, 12-bit signals of 4N channels defined by the SMPTE 274.

The number of times of folding indicating using 960/N sample of which line 1920 samples of one line are generated, the number of samples obtained by vertical rectangular region sampling-out, and the number of lines obtained by vertical rectangular region sampling-out every N frames, are obtained from the following expressions.

The number of times of folding=2160×N/1080=2N

The number of samples obtained by vertical rectangular region sampling-out=960/N (the number of samples)×2N (the number of times of folding)=1920 samples The number of lines obtained by vertical rectangular region sampling-out every N frames=2160/2N×N=1080 lines This result shows that pixel samples sampled out from the first to N-th UHDTV1 class images correspond with the video data regions of the 1920×1080 video signal which is the first to 4N-th sub-images.

The mapped 1920×1080/50P-60P signals of 4N channels first undergo line sampling-out so as to be divided into two 1920×1080/50I, 59.94I, 60I signals as prescribed by FIG. 2 of the SMPTE 435-1. In the case of a 10-bit, 12-bit signal of 4:4:4 or a 12-bit signal of 4:2:2, word sampling-out is further performed. At this time, the word sampling-out control section is prescribed by the SMPTE 435-1. In addition, the readout control section transmits the signal with HD-SDIs of 1.5 Gbps of four channels read out from a RAM. Therefore, the 3840×2160/100P-120P/4:4:4, 4:2:2, 4:2:0/10-bit, 12-bit signal can be transmitted with HD-SDIs of 16N channels in total. In addition, in the case of a 4:2:2/10-bit signal, the signal can be transmitted with HD-SDIs of 16 channels.

In this way, the 3840×2160/(50P-60P)×N/4:4:4, 4:2:2, 4:2:0/10-bit, 12-bit signal can be mapped to the HD-SDIs of 16N channels. Further, the 3840×2160/(50P-60P)×N/4:4:4, 4:2:2, 4:2:0/10-bit, 12-bit signal can be multiplexed at 10.692 Gbps in the mode D of 10G of 2N channels and be transmitted. As this multiplexing method, a method disclosed in JP-A-2008-099189 is used. In addition, in the case of 4:2:2, the Link B is not used, and only CH1, CH3, CH5, and CH7 are used. An example of the mapping process to 10G-SDI or a configuration example of the processing blocks of the transmission circuit or the reception circuit are similar to the configuration example according to the above-described embodiments.

When the HD-SDIs are received, the reproduction unit 39 according to the third embodiment performs a multiplexing process. At this time, the reproduction unit 39 performs a process reverse to the process performed by the mapping unit 11. That is to say, the vertical rectangular region multiplexing control section multiplexes pixel samples which are read out every n'/2N pixel samples from the video data regions of the first to 4N-th sub-images, into the first to N-th class images. Thereby, the reproduction unit 39 can multiplex the pixel samples into the first to N-th UHDTV1 class images.

The word multiplexing control sections and the vertical rectangular region multiplexing control sections in the reproduction unit 39 perform the following processes in detail.

First, the word multiplexing control sections according to the third embodiment of the present disclosure multiplex pixel samples extracted from video data regions of the 10.692 Gbps stream defined by the four-channel mode D corresponding to each of the first to 4N-th sub-images. In the first to 4N-th video data regions, m'×n' is 1920×1080, a'–b' is 50P, 59.94P, 60P, and r':g':b' is 4:4:4, 4:2:2, 4:2:0, which are prescribed by the SMPTE 435-1. After line multiplexing, the vertical rectangular region multiplexing control sections multiplex the pixel samples extracted from the video data regions of the first to 4N-th sub-images into the first to N-th class images. At this time, pixel samples of the same number as positions of the pixel samples prescribed in the UHDTV1 class image, extracted from the video data regions of the first to 4N-th sub-images are multiplexed.

The broadcasting cameras 1 according to the third embodiment described above perform the following sampling-out process. That is to say, a video signal which is a 3840×2160 signal having a large number of pixels and having a frame rate which is N times higher than 50P-60P is sampled out every N frames in a unit of 960/N pixel samples so as to be mapped to first to 4N-th 1920×1080 signals. Thereafter, the line sampling-out and the word sampling-out are performed. This sampling-out process minimizes the memory capacity necessary to map a signal and can suppress the signal transmission delay to the minimum level since the memory capacity is minimized.

In addition, the CCU 2 according to the third embodiment performs the word multiplexing, the line multiplexing, the vertical rectangular region multiplexing, the two-pixel multiplexing based on 16N HD-SDIs received from the broadcasting cameras 1, thereby generating the UHDTV1 class image. At this time, pixel samples read out from the video data regions of the consecutive first to 4N-th 1920×1080 signals are multiplexed into the first to N-th UHDTV1 class images.

4. Fourth Embodiment

Example of UHDTV2,
7680×4320/(50P-60P)×N/4:4:4, 4:2:2, 4:2:0/10 Bits,
12 Bits

Next, an operation example of the mapping unit 11 and the reproduction unit 39 according to the fourth embodiment of the present disclosure will be described with reference to FIG. 18.

Figure 18:
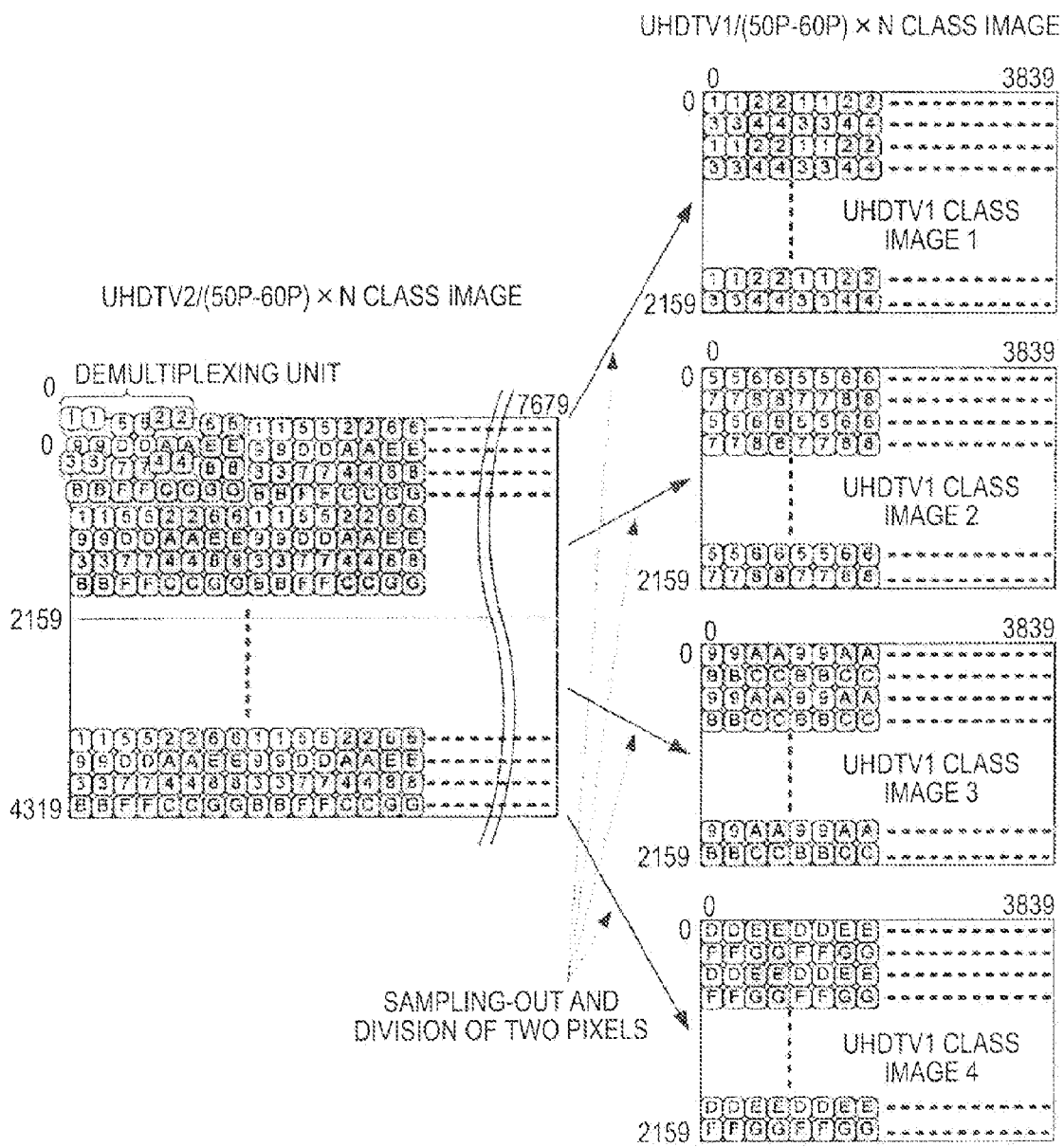
FIG. 18 is a diagram illustrating a processing example where a mapping section according to a fourth embodiment of the present disclosure maps pixel samples included in the UHDTV2 class image where the frame rate is N times 50P-60P to the UHDTV1 class image where the frame rate is N times 50P-60P.

FIG. 18 is a processing example where the mapping unit 11 maps pixel samples included in the UHDTV2 class image which has a frame rate which is N times higher than 50P-60P and repeats the 0th to third lines. This mapping process is performed to the UHDTV1 class image having a frame rate which is N times higher than 50P-60P. Since N is an integer equal to or more than 2, (50P-60P)×N indicates a video signal substantially having a frame rate equal to or higher than 100P-120P.

A 7680×4320/(50P-60P)×N/4:4:4, 4:2:2, 4:2:0/10-bit, 12-bit signal has a frame rate equal to N times that of the 7680×4320/50P-60P/4:4:4, 4:2:2, 4:2:0/10-bit, 12-bit signal prescribed by the S2036-1. However, both the two are different in colorimetry, but digital signal formats such as inhibition codes are the same.

The two-pixel sampling-out control section 62 included in the mapping unit 11 maps two pixel samples adjacent to each other on the same line for each line of four consecutive lines from the UHDTV2 class image to the first to fourth UHDTV1 class images. At this time, the respective pixel samples included every other line from the 0th line of the UHDTV2 class image are mapped to the same line of the first UHDTV1 class image every two other pixel samples for each line. Next, the respective pixel samples which are included every other line from the 0th line of the UHDTV2 class image and are different from the pixel samples mapped to the first UHDTV1 class image are mapped. This mapping process is performed on the same line of the second UHDTV1 class image every two other pixel samples. Next, the respective pixel samples included every other line from the first line of the UHDTV2 class image are mapped to the same line of the third UHDTV1 class image every two other pixel samples for each line. Next, the respective pixel samples which are included every other line from the first line of the UHDTV2 class image and are different from the pixel samples mapped to the third UHDTV1 class image are mapped. This mapping process is performed on the same line of the fourth UHDTV1 class image every two other pixel samples. In this way, the 7680×4320/(50P-60P)×N/4:4:4, 4:2:2, 4:2:0/10-bit, 12-bit signal is sampled out every two pixel samples in a unit of two lines in the horizontal direction. Thereafter, the pixel samples can be mapped to a 3840×2160/(50P-60P)×N/4:4:4, 4:2:2, 4:2:0/10-bit, 12-bit signal of four channels.

In addition, FIG. 18 shows an example where four consecutive lines are read out from the UHDTV2 class image at one time, and are mapped to the first to fourth UHDTV1 class images. However, two consecutive lines may be read out from the UHDTV2 class image, and pixel samples included in each line may be mapped to the first and second UHDTV1 class images, or the third and fourth UHDTV1 class images.

The 3840×2160/(50P-60P)×N/4:4:4, 4:2:2, 4:2:0/10-bit, 12-bit signals of four channels undergo vertical rectangular region sampling-out, line sampling-out, and word sampling-out, and are transmitted in the mode D of 10 Gbps of 2N channels by the method described in the third embodiment. For this reason, the broadcasting cameras 1 can transmit 7680×4320/(50P-60P)×N/4:4:4, 4:2:2, 4:2:0/10-bit, 12-bit signals in the mode D of 10 Gbps of 8N channels in total.

On the other hand, the reproduction unit 39 receives the video signals transmitted in the mode D of 10 Gbps of 8N channels. In addition, the reproduction unit 39 performs word sampling-out, line sampling-out, and two-pixel sampling-out for pixel samples, thereby generating first to 4N-th sub-images. At this time, pixel samples extracted from each of the sub-images are multiplexed into the UHDTV1 class images from the first frame to the N-th frame. In addition, pixel samples read out from the first to fourth UHDTV1 class images are multiplexed into the UHDTV2 class images by the method described in the second embodiment.

The two-pixel multiplexing control section 82 included in the reproduction unit 39 multiplexes pixel samples from the RAMS 84-1 to 84-4 every two pixel samples through the following processes. That is to say, the two-pixel multiplexing control section 82 multiplexes pixel samples extracted from the first to fourth UHDTV1 class images into positions of two pixel samples adjacent to each other on the same line for each line of four consecutive lines of the UHDTV2 class image. At this time, pixel samples extracted every two pixel samples for each line from the same line of the first UHDTV1 class image are multiplexed into the UHDTV2 class image every other line from the 0th line and every two other pixel samples on the same line. Next, pixel samples extracted every two pixel samples for each line from the same line of the second UHDTV1 class image are multiplexed. This multiplexing process is performed every other line from the 0th line of the UHDTV2 class image and every two other pixel samples on the same line at positions different from those of the pixel samples multiplexed from the first UHDTV1 class image. Next, pixel samples extracted every two pixel samples for each line from the same line of the third UHDTV1 class image are multiplexed into the UHDTV2 class image every other line from the first line and every two other pixel samples on the same line. Next, pixel samples extracted every two pixel samples for each line from the same line of the fourth UHDTV1 class image are multiplexed. This multiplexing process is performed every other line from the first line of the UHDTV2 class image and every two other pixel samples on the same line at positions different from those of the pixel samples multiplexed from the third UHDTV1 class image.

Thereby, the reproduction unit 39 can reproduce the UHDTV2 class images from the UHDTV1 class images.

The mapping unit 11 according to the above-described fourth embodiment maps a video signal to the UHDTV1 class images of 4N frames from the UHDTV2 class images of N frames having a frame rate which is N times higher than 50P-60P. Thereafter, the mapping unit 11 may perform line sampling-out and word sampling-out for the video signal, and then transmit the video signal as a video signal of the existing HD.

On the other hand, the reproduction unit 39 according to the fourth embodiment may perform word multiplexing and line multiplexing for the received video signal of the existing HD, generate UHDTV1 class images of 4N frames, and multiplex pixel samples into the UHDTV2 class images of N frames. As such, it is possible to rapidly transmit the UHDTV2 class images of N frames having a frame rate which is N times higher than 50P-60P using the existing interface.

5. Fifth Embodiment

Example of 4096×2160/96P-120P/4:44, 4:2:2/10 Bits, 12 Bits

Next, an operation example of the mapping unit 11 and the reproduction unit 39 according to the fifth embodiment of the present disclosure will be described with reference to FIGS. 19 to 21.

First, an example of the method of multiplexing data included in HD-SDIs of a plurality of channels will be described with reference to FIG. 19. The method of multiplexing data is prescribed as the mode B by the SMPTE 435-2.

Figure 19:
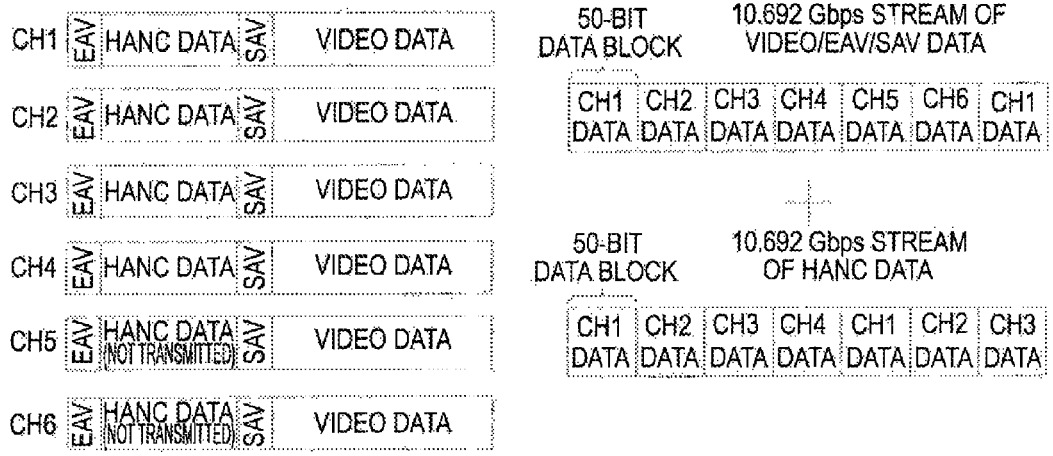
FIG. 19 is a diagram illustrating an example of the mode B.

FIG. 19 is a diagram illustrating the mode B.

The mode B is a method of multiplexing HD-SDIs of sixth channels CH1 to CH6.

In the mode B, data is multiplexed into the video data region and the horizontal auxiliary data space of a 10.692 Gbps stream. Data of video/EAV/SAV of four words included in the HD-SDIs of six channels CH1 to CH6 undergoes 8B/10B conversion, and then is encoded to a data block of five words (50 bits). In addition, the data is multiplexed into the video data regions of the 10.692 Gbps stream beginning from the head of the SAV in the channel order.

On the other hand, the horizontal auxiliary data spaces of HD-SDIs of four channels CH1 to CH4 undergo 8B/10B conversion, are encoded to a data block of 50 bits, and are multiplexed into horizontal auxiliary data spaces of the 10.692 Gbps stream in the channel order. However, the horizontal auxiliary data spaces of HD-SDIs of CH5 and CH6 are not transmitted.

Next, there will be made of a description of an example where pixel samples of a 4096×2160/96P-120P/4:4:4, 4:2:2/ 10-bit, 12-bit signal is mapped to first to t-th sub-images (in this example, t=8, and, hereinafter, described as first to eighth sub-images).

Figure 20:
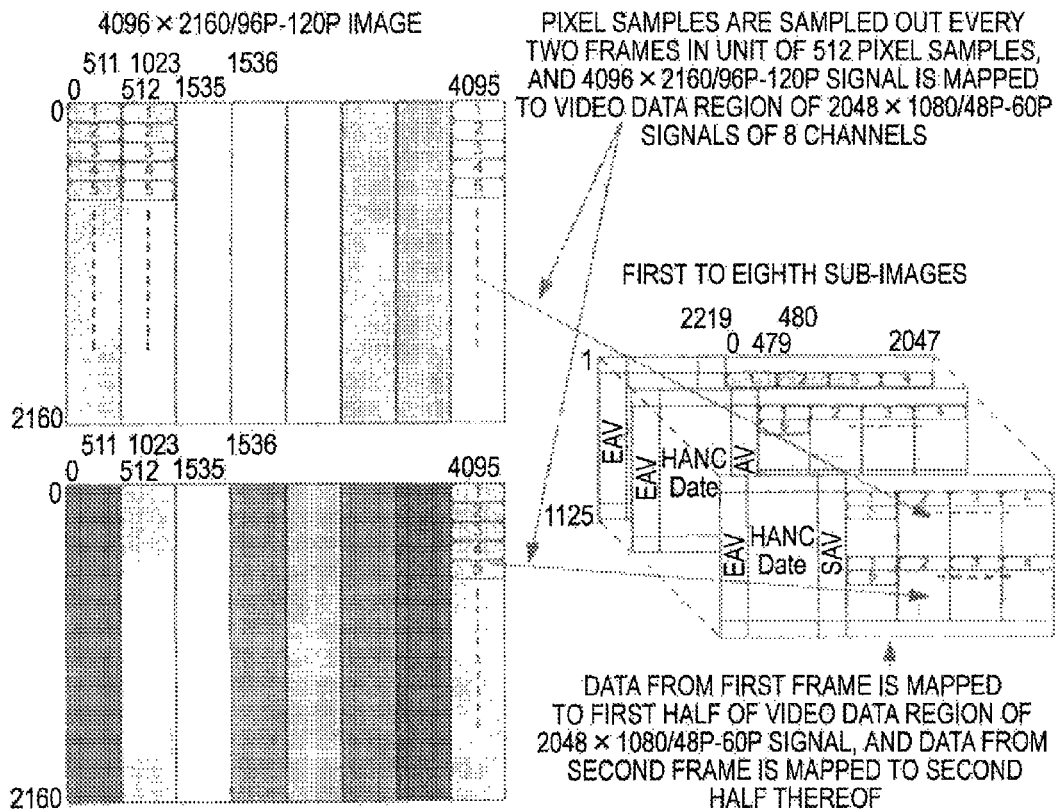
FIG. 20 is a diagram illustrating a processing example where a mapping section according to a fifth embodiment of the present disclosure maps pixel samples included in 4096×2160 where the frame rate is 96P-120P to first to eighth sub-images.

FIG. 20 shows a processing example where the mapping unit 11 maps pixel samples included in a 4096×2160 class image having a frame rate of 96P-120P to first to eighth sub-images. Here, in the 4096×2160 class image, m×n is 4096×2160, a–b is (47.95P, 48P, 50P, 59.94P, 60P)×N (where N is an integer equal to or more than 2), and r:g:b is 4:4:4, 4:4:2. Further, a case where first and second class images are 4096×2160 class images will be described.

A 4096×2160/96P-120P/4:4:4, 4:2:2/10-bit, 12-bit signal has a frame rate equal to twice that of the 4096×2160/48P-60P/4:4:4, 4:2:2/10-bit, 12-bit signal prescribed by the S2048-1. However, both the two are different in colorimetry, but a digital signal format such as an inhibition code is the same.

Here, pixel samples of the 4096×2160/96P-120P/4:4:4, 4:2:2/10-bit, 12-bit signal are sampled out every 512 pixel samples in a unit of two consecutive frames and are mapped to video data regions of 2048×1080/48P-60P. At this time, the vertical rectangular region sampling-out control sections map the pixel samples to the video data regions of the first to eighth sub-images. In the first to eighth sub-images, m'×n' is 2048× 1080, a'–b' is 47.95P, 48P, 50P, 59.94P, 60P, r':g':b' is 4:4:4, 4:2:2. In other words, the pixel samples are mapped to 2048× 1080/48P-60P/4:4:4, 4:2:2/10-bit, 12-bit signals of 8 channels prescribed by the SMPTE 2048-2.

The 4096×2160/96P-120P/4:4:4, 4:2:2/10-bit, 12-bit signal is sampled out in a unit of 512 pixel samples in the vertical rectangular regions (sequentially extracted from each line for each line in a unit of 512 pixel samples). Thereafter, the pixel samples are multiplexed into effective regions of 2048×1080/ 48P-60P. Thereby, each signal is mapped to 2048×2160/48P-60P/4:4:4, 4:2:2/10-bit, 12-bit signals of 8 channels prescribed by the SMPTE 2048-2.

The number of samples obtained by vertical rectangular region sampling-out and the number of lines obtained by vertical rectangular region sampling-out every two frames are obtained from the following calculation, which shows that the pixel samples correspond with the effective regions of the 2048×1080 video signal.

The number of samples obtained by vertical rectangular region sampling-out=4096/8×4=2048 samples The number of lines obtained by vertical rectangular region sampling-out every two frames=2160/4×2=1080 lines On the effective regions of the mapped 2048×1080/48P-60P, a signal of the initial frame of the 4096×2160/96P-120P/ 4:4:4, 4:2:2/10-bit, 12-bit signal is mapped to the first half part. In addition, a signal of the next frame is mapped to the second half part.

The number of samples obtained by vertical rectangular region sampling-out=4096/8×4=2048 samples The number of lines obtained by vertical rectangular region sampling-out every two frames=2160/4×2=1080 lines This result shows that pixel samples correspond with the video data regions of the 2048×1080 video signal.

Figure 21:
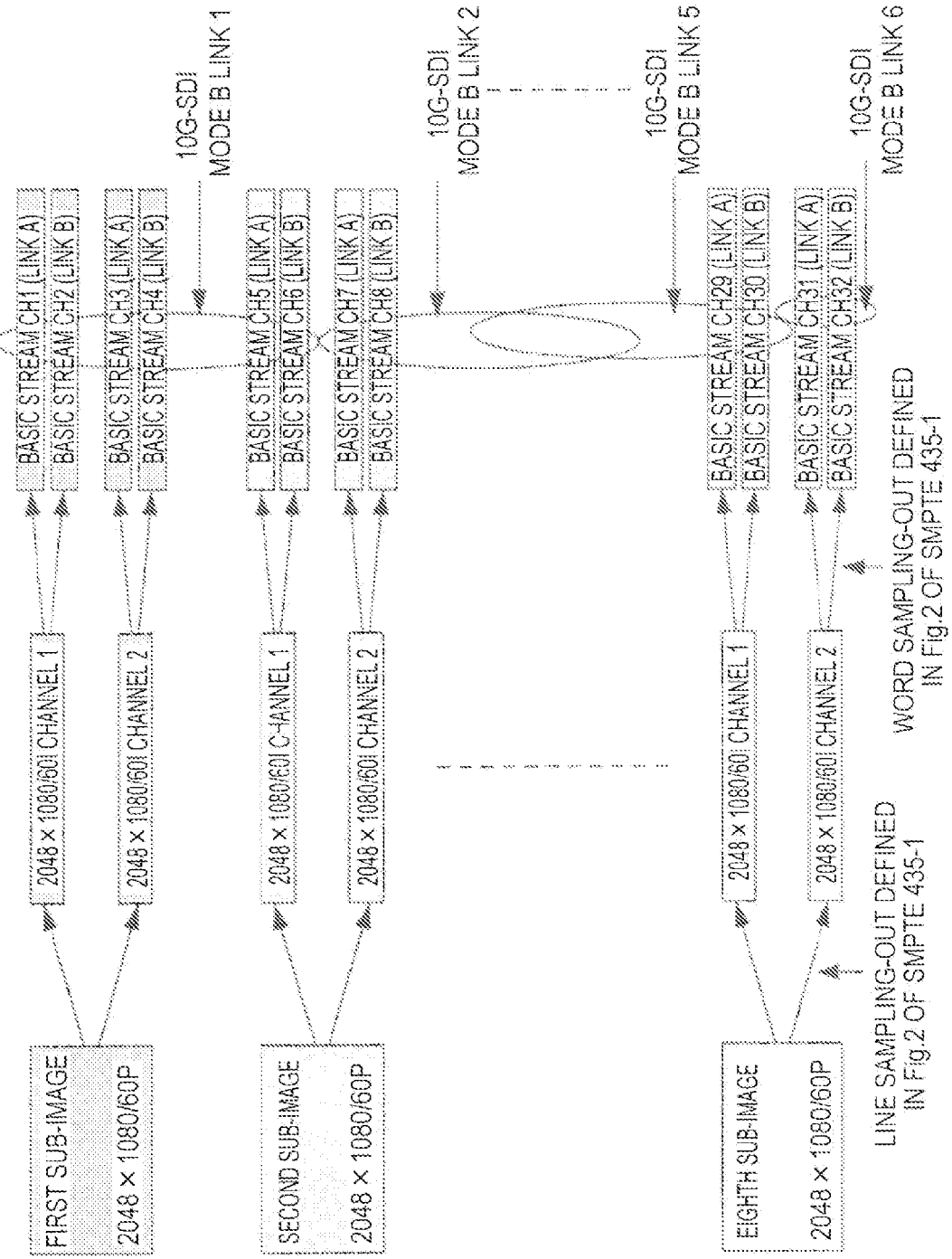
FIG. 21 is a diagram illustrating an example where the mapping section according to the fifth embodiment of the present disclosure samples out the first to eighth sub-images for each line and each word so as to be mapped to the mode B.

FIG. 21 shows an example where the first to eighth sub-images undergo line sampling-out and word sampling-out, and are then mapped to the mode B.

Here, a processing example where the first to eighth sub-images (2048×1080/60P/4:4:4/12-bit signal) to which pixel samples are mapped are divided into the Link A or the Link B according to the prescription of the SMPTE 372M and are then mapped.

The SMPTE 435 is a standard of the 10G interface. This standard defines that HD-SDI signals of a plurality of channels are converted into signals of 50 bits through 8B/10B encoding in a unit of 40 bits, and are multiplexed for each channel. Further, the standard defines that signals are serially transmitted at a bit rate of 10.692 Gbps or 10.692 Gbps/1.001 (hereinafter, simply referred to as 10.692 Gbps). A technique for mapping the 4 k×2 k signal to an HD-SDI signal is shown in FIGS. 3 and 4 of 6.4 Octa link 1.5 Gbps Class of SMPTE 435 Part 1.

The mapped 2048×1080/48P-60P signals of 8 channels first undergo line sampling-out so as to be divided into two 2048×1080/47.95P, 48P, 50I, 59.94I, and 60I signals as prescribed by FIG. 2 of the SMPTE 435-1. In the case of a 12-bit signal of 4:4:4 or 4:2:2, word sampling-out is further performed, and then each signal is transmitted with 1.5 Gbps HD-SDIs of 4 channels. Therefore, the 4096×2160/96P-120P/4:4:4, 4:2:2/10-bit, 12-bit signal can be transmitted with HD-SDIs of 32 channels in total. In addition, in the case of a 4:2:2/10-bit signal, the signal can be transmitted with 16 channels.

In this way, the 4096×2160/96P-120P/4:4:4, 4:2:2/10-bit, 12-bit signal mapped to the HD-SDIs of 32 channels can be multiplexed into 10.692 Gbps Mode B which is the mode B of 6 channels and be transmitted. As this multiplexing method, a method disclosed in JP-A-2008-099189 is used. In addition, in the case of 4:2:2, the Link B is not used, and only the channels CH1, CH3, CH5, and CH7 are used. An example of the mapping process to 10G-SDI or a configuration example of the processing blocks of the transmission circuit or the reception circuit are similar to the configuration example according to the above-described embodiments.

In addition, a signal of the first frame of the 4096×2160/96P-120P/4:4:4, 4:2:2/10-bit, 12-bit signal is mapped to the first half parts of the video data regions of the 2048×1080/48P-60P signal in the first to eighth sub-images. Then, a signal of the next frame is mapped to the second half parts. The mapped 2048×1080/48P-60P signals of 8 channels mapped to the first to eighth sub-images first undergo line sampling-out so as to be divided into two 2048×1080/48I-60I signals as prescribed by FIG. 2 of the SMPTE 435-1.

In the case where the 2048×1080/48I-60I signal is a 10-bit, 12-bit signal of 4:4:4 or a 12-bit signal of 4:2:2, word sampling-out is further performed, and then is transmitted with HD-SDIs of 1.5 Gbps. The word sampling-out control sections multiplex the pixel samples into video data regions of a 10.692 Gbps stream defined by the six-channel mode B which is prescribed by the SMPTE 435-2 and corresponds to each of the first to eighth sub-images. Therefore, the 4096×2160/96P-120P/4:4:4, 4:2:2/10-bit, 12-bit signal can be transmitted with HD-SDIs of 32 channels in total as shown in FIG. 20. In addition, the signal is transmitted with HD-SDIs of 16 channels in the case of 4:2:2/10 bits.

Specifically, the mapping unit 11 converts the first to eighth sub-images set by the 2048×1080/48P-60P/4:4:4, 4:2:2/10-bit, 12-bit signal into interlace signals of 16 channels. Thereafter, the mapping unit 11 generates CH1 to CH32 by the SMPTE 372M (dual-link). Of the channels CH1 to CH32, there are channels CH1 (Link A) and CH2 (Link B), channels CH3 (Link A) and CH4 (Link B), . . . , and channels CH31 (Link A) and CH32 (Link B). In this example, the HD-SDI CH1 to CH6 are transmitted as 10G-SDI mode B Link 1. Similarly, the HD-SDI CH7 to CH12 are transmitted as 10G-SDI mode B Link 2, and the HD-SDI CH13 to CH18 are transmitted as 10G-SDI mode B Link 3. In addition, the HD-SDI CH19 to CH24 are transmitted as 10G-SDI mode B Link 4, the HD-SDI CH25 to CH30 are transmitted as 10G-SDI mode B Link 5, and the HD-SDI CH31 and CH32 are transmitted as 10G-SDI mode B Link 6.

In the way, the signal is mapped to the HD-SDIs of 32 channels. Thereafter, the 4096×2160/96P-120P/4:4:4, 4:2:2/10-bit, 12-bit signal is multiplexed into the 10.692 Gbps mode B of 6 channels and are then transmitted. At this time, in the case of 4:2:2, the Link B is not used, and only CH1, CH3, and CH5 are used.

On the other hand, the reproduction unit 39 performs a process reverse to the process performed by the mapping unit so as to reproduce the 4096×2160/96P-120P/4:4:4, 4:2:2/10-bit, 12-bit signal. At this time, the word multiplex control sections multiplex pixel samples extracted from video data regions of the 10.692 Gbps stream defined by the six-channel mode B of which is prescribed by the SMPTE 435-2 and corresponds to each of the first to eighth sub-images into lines. The line multiplexing control sections multiplex two lines so as to generate first to eighth sub-images. In addition, the vertical rectangular region multiplexing control sections map pixel samples extracted from the video data regions of the first to eighth sub-images to 4096×2160 class images.

The broadcasting cameras 1 according to the above-described fifth embodiment samples out a video signal of 4096×2160/96P-120P every 512 pixel samples in a unit of two consecutive frames. In addition, the broadcasting cameras 1 may map the first to eighth sub-images (2048×1080/48P-60P of 8 channels). Further, the broadcasting cameras 1 may perform line sampling-out and word sampling-out for the first to eighth sub-images, map pixel samples to the Links A and B of 10G-SDI mode B of 6 channels, and transmit a video signal.

The CCU 2 according to the fifth embodiment extracts pixel samples 10G-SDI mode B Links of 6 channels, performs word multiplexing and line multiplexing, and generates the first to eighth sub-images. In addition, the CCU 2 multiplexes 512 pixel samples extracted from the first to eighth sub-images into a video signal of 4096×2160/96P-120P in a unit of two consecutive frames. In this way, it is possible to transmit and receive the video signal of 4096×2160/96P-120P.

Further, in the transmission system 10 according to the above-described first to fifth embodiments, a 3840×2160/100P-120P signal or a 7680×4320/100P-120P signal which may be proposed with high possibility in the future undergoes vertical rectangular region sampling-out and line sampling-out and finally word sampling-out. Thereby, the signals can be mapped to 1920×1080/50I-60I signals of multi-channels. The mapping method in the first to fifth embodiments described above uses the least memory capacity and exhibits a comparatively small delay. Further, the 1920×1080/50I-60I signal prescribed by the SMPTE 274M can be observed by an existing measuring instrument. In addition, it is possible to sample out a 3840×2160/100P-120P signal or a 7680×4320/100P-120P signal in a unit of a pixel or in a unit of a time period to observe the same. Further, since the method can match with various existing SMPTE mapping standards, it has high possibility that standardization may be approved by the SMPTE in the future.

The mapping method in the first to fifth embodiments employs the following processes, and the multiplexing method employs processes reverse thereto. That is to say, 3840×2160/100P-120P signal, a 7680×4320/100P-120P signal, 2048×1080/100P-120P signal, or a 4096×2160/96P-120P signal is sampled out. The sampling-out process is performed every p pixel samples in a unit of two consecutive frames. Thereafter, pixel samples are multiplexed into video data regions of HD-SDIs of 1920×1080/50P-60P signal or a 2048×1080/48P-60P signal, and then can be multiplexed into 10.692 Gbps of 4 channels, 6 channels or 16 channels and be transmitted. In this case, the following effects can be achieved.

(1) A 3840×2160/100P-120P signal or a 7680×4320/100P-120P signal which is a video signal of the next generation is under consideration by the ITU or the SMPTE. In addition, 4096×2160/96P-120P signal, 3840×2160/(50P-60P)×N a 7680×4320/(50P-60P)×N signal, or signal, 4096×2160/(48P-60P)×N signal is also under consideration. In addition, a video signal may be transmitted with a 10G interface of multi-channels using a method disclosed in Japanese Patent No. 4645638.

(2) The current HD video standard SMPTE 274 or 2048× 1080 and 4096×2160 Digital Cinematography Production image Format FS/709 S2048-1,2 only prescribes a frame rate of up to 60P. In addition, it may be very difficult to revise the SMPTE 274 for addition of 120P in a current state where HD apparatuses come into widespread use, are developed, and are sold. For this reason, the method has been examined in which a future high frame signal having a frame rate equal to an integral multiple of 50P-60P is mapped to the 1920×1080/50P-60P or a 2048×1080/48P-60P of multi-channels, prescribed by the existing SMPTE 274 or the SMPTE 2048-2, and is then transmitted. Further, a method of transmitting 3840×2160 or 7680×4320/50P-60P signal with 10G-SDIs of multi-channels is being standardized by the SMPTE 2036-3 at present. In addition, a method of transmitting 4096×2160/48P-60P signal with 10G-SDIs of multi-channels can be proposed for standardization by the SMPTE 2048-3. The SMPTE 2036-3 or the SMPTE 2048-3 employs the same method as the vertical rectangular region sampling-out method (Japanese Patent No. 4645638) according to the above-described embodiments, and thus the method according to the embodiments may be standardized with high possibility in the future by the SMPTE.

(3) By sampling out a 4 k, 8 k signal every p pixel samples in the horizontal direction, the video of the entire screen can be observed using an existing monitor for the HD or a waveform monitor or an 8 k signal can be observed using a future 4 k monitor or the like. Therefore, the transmission system 10 is effective for analysis of a fault when a video apparatus is developed and so forth.

(4) When 3840×2160/100P-120P signals or 7680×4320/100P-120P signals are transmitted at 10.692 Gbps in the mode D of four channels or 16 channels, the transmission system can be constructed with a minimum delay. Further, it is possible to cause the method in which sampling-out is performed every p pixel samples in the horizontal direction from frames of 3840×2160 or 7680×4320 class images, to match with the S2036-3, which is under consideration by the SMPTE. The S2036-3 relates to a mapping standard of 3840×2160/23.98P-60P or 7680×4320/23.98P-60P to the mode D of 10.692 Gbps of multi-channels.

(5) In addition, the number of pixels extracted when pixel sampling-out or multiplexing is performed is reduced, and thus it is possible to suppress a memory volume used as a temporary region. Here, line sampling-out for conversion into 1920×1080/50I-60I signals of two channels through line sampling-out of a 1920×1080/50P-60P signal uses a method prescribed by the SMPTE 372 standard. This standard prescribes a method of mapping a 1920×1080/50P-60P signal to 1920×1080/50I-60I signals of two channels. For this reason, by the use of the mapping method according to the embodiments, the method can match with the mapping method defined by the SMPTE 372 standard.

6. Modified Example

Meanwhile, the above-described series of processes may be performed by hardware or software. When a series of processes is performed by the software, a computer where programs constituting the software are incorporated into dedicated hardware or a computer to which programs for executing various kinds of functions are installed, can execute the processes. For example, a program including desired software may be installed to, for example, a general purpose personal computer and be executed.

A recording medium recording program codes of software for realizing the functions of the above-described embodiments thereon may be supplied to a system or an apparatus. In addition, a computer (or a control device such as a CPU) of the system or the apparatus may read out the program codes stored in the recording medium so as to be executed, thereby realizing the functions.

As the recording medium for supplying program codes in this case, for example, a flexible disc, a hard disk, an optical disc, a magneto-optical disc, a CD-ROM, a CD-R, a magnetic tape, a nonvolatile memory card, a ROM, or the like may be used.

The functions of the above-described embodiments are realized by executing the program codes readout by the computer. An OS or the like running on the computer performs a part of or the whole of practical processes based on an instruction of the program codes. A case where the functions of the above-described embodiments are realized through the processes is also included.

The present disclosure is not limited to the above-described embodiments, and may have various other applications and modifications without departing from the spirit of the present disclosure described in the appended claims.

The present disclosure contains subject matter related to that disclosed in Japanese Priority Patent Application JP 2011-117707 filed in the Japan Patent Office on May 26, 2011, the entire contents of which are hereby incorporated by reference.

What is claimed is:
1. A signal transmission apparatus comprising:
a vertical rectangular region sampling-out control section that obtains first to t-th vertical rectangular regions by dividing first and second class images into t by p (where p is an integer equal to or more than 1) pixel samples in the horizontal direction, repeatedly performs a process where pixel samples read out from each line of a 0th line to a (n−1)-th line of the first and second class images are mapped to each line of video data regions of first to t-th sub-images in a unit of p pixel samples in the horizontal direction for each of the first to t-th vertical rectangular regions, in an order of the first class image and the second class image, maps pixel samples to each line of the video data regions of the first to t-th sub-images in a unit of p pixel samples m'/p times, and repeatedly maps pixel samples to the next line which is vertically subsequent to the line to which the pixel samples have been mapped in a unit of p pixel samples, in a case of mapping pixel samples of the consecutive first and second class images prescribed by an m×n (where in and n indicating m samples and n lines are positive integers)/a−b (where a and b are frame rates of a progressive signal)/r:g:b (where r, g, and b are signal ratios in a case of a predetermined signal transmission method)/10-bit, 12-bit signal having the number of pixels of one frame exceeding the number of pixels prescribed by an HD-SDI format of SMPTE (Society of Motion Picture and Television Engineers) 435-2, to first to t-th (where t is an integer equal to or more than 8) sub-images prescribed by an m'×n' (m' and n' indicating m' samples and n' lines are positive integers)/a'−b' (a' and b' are frame rates of a progressive signal)/r':g':b' (r', g', and b' are signal ratios in a case of a predetermined signal transmission method)/10-bit, 12-bit signal;

a line sampling-out control section that samples out the pixel samples every other line from each line of the first to t-th sub-images to which the pixel samples have been mapped, so as to generate an interlace signal;

a word sampling-out control section that samples out for each word the pixel samples which have been sampled out for each line so as to be mapped to video data regions of the HD-SDI format prescribed by SMPTE 435-2; and a readout control section that outputs the HD-SDI format.

2. The signal transmission apparatus according to claim 1, wherein, in a case of the first and second class images where m×n is 3840×2160, a–b is 100P, 119.88P, 120P, and r:g:b is 4:4:4, 4:2:2, 4:2:0 in a UHDTV1 class image, the vertical rectangular region sampling-out control section maps the pixel samples to video data regions of the first to t-th sub-images where m'×n' is 1920×1080, a'–b' is 50P, 59.94P, 60P, and r':g':b' is 4:4:4, 4:2:2, 4:2:0; and the word sampling-out control section multiplexes the pixel samples into video data regions of a 10.692 Gbps stream defined by four-channel mode D which is prescribed by the SMPTE 435-2 and corresponds to each of the first to t-th sub-images.

3. The signal transmission apparatus according to claim 2, further comprising a two-pixel sampling-out control section that maps the respective pixel samples included every other line from the 0th line of a UHDTV2 class image to the same line of a first UHDTV1 class image every two other pixel samples for each line, maps the respective pixel samples included every other line from the 0th line of the UHDTV2 class image and are different from the pixel samples mapped to the first UHDTV1 class image, to the same line of a second UHDTV1 class image every two other pixel samples, maps the respective pixel samples included every other line from the first line of the UHDTV2 class image to the same line of a third UHDTV1 class image every two other pixel samples for each line, and maps the respective pixel samples which are included every other line from the first line of the UHDTV2 class image and are different from the pixel samples mapped to the third UHDTV1 class image, to the same line of a fourth UHDTV1 class image every two other pixel samples, in a case of mapping pixel samples obtained by sampling out two pixel samples adjacent to each other on the same line for each line of four consecutive lines from the UHDTV2 class image which is prescribed by a 7680×4320/100P, 119.88P, 120P/4:4:4, 4:2:2, 4:2:0/10-bit, 12-bit signal and repeats the 0th to third lines, to the first to fourth UHDTV1 class images.

4. The signal transmission apparatus according to claim 1, wherein, in a case of first to N-th (where N is an integer equal to or more than 2) class images including the first and second class images where m×n is 3840×2160, a–b is (50P, 59.94P, 60P)×N, r:g:b is 4:4:4, 4:2:2, 4:2:0, and the number of lines of the class images is 0, 1, . . . , 2N–2, 2N–1, in a UHDTV1 class image, the vertical rectangular region sampling-out control section maps the pixel samples to video data regions of the first to t-th sub-images where m'×n' is 1920×1080, a'–b' is 50P, 59.94P, 60P, r':g':b' is 4:4:4, 4:2:2, 4:2:0, t=4N, every n'/2N pixel samples; and the word sampling-out control section multiplexes the pixel samples into video data regions of a 10.692 Gbps stream defined by four-channel mode D which is prescribed by SMPTE 435-2 and corresponds to each of the first to t-th sub-images.

5. The signal transmission apparatus according to claim 4, further comprising a two-pixel sampling-out control section that maps the respective pixel samples included every other line from the 0th line of a UHDTV2 class image to the same line of a first UHDTV1 class image every two other pixel samples for each line, maps the respective pixel samples which are included every other line from the 0th line of the UHDTV2 class image and are different from the pixel samples mapped to the first UHDTV1 class image, to the same line of a second UHDTV1 class image every two other pixel samples, maps the respective pixel samples included every other line from the first line of the UHDTV2 class image to the same line of a third UHDTV1 class image every two other pixel samples for each line, and maps the respective pixel samples which are included every other line from the first line of the UHDTV2 class image and are different from the pixel samples mapped to the third UHDTV1 class image, to the same line of a fourth UHDTV1 class image every two other pixel samples, in a case of mapping pixel samples obtained by sampling out two pixel samples adjacent to each other on the same line for each line of four consecutive lines from the UHDTV2 class image which is prescribed by a 7680×4320/(50P, 59.94P, 60P)×N/4:4:4, 4:2:2, 4:2:0/10-bit, 12-bit signal and repeats the 0th to third lines, to the first to fourth UHDTV1 class images.

6. The signal transmission apparatus according to claim 1, wherein, in a case where m×n is 4096×2160, a–b is (47.95P, 48P, 50P, 59.94P, 60P)×N (where N is an integer equal to or more than 2) r:g:b is 4:4:4, 4:2:2, and the first and second class images are 4096×2160 class images, the vertical rectangular region sampling-out control section maps the pixel samples to video data regions of the first to t-th sub-images where m'×n' is 2048×1080, is 47.95P, 48P, 50P, 59.94P, 60P, and r':g':b' is 4:4:4, 4:2:2; and the word sampling-out control section multiplexes the pixel samples into video data regions of a 10.692 Gbps stream defined by six-channel mode B which is prescribed by SMPTE 435-1 and corresponds to each of the first to t-th sub-images.

7. A signal transmission method comprising:
obtaining first to t-th vertical rectangular regions by dividing first and second class images into t by p (where p is an integer equal to or more than 1) pixel samples in the horizontal direction, repeatedly performing a process where pixel samples read out from each line of a 0th line to a (n–1)-th line of the first and second class images are mapped to each line of video data regions of first to t-th sub-images in a unit of p pixel samples in the horizontal direction for each of the first to t-th vertical rectangular regions, in an order of the first class image and the second class image, mapping pixel samples to each line of the video data regions of the first to t-th sub-images in a unit of p pixel samples m'/p times, and repeatedly mapping pixel samples to the next line which is vertically subsequent to the line to which the pixel samples have been mapped in a unit of p pixel samples, in a case of mapping pixel samples of the consecutive first and second class images prescribed by an m×n (where m and n indicating m samples and n lines are positive integers)/ a–b (where a and b are frame rates of a progressive signal)/r:g:b (where r, g, and b are signal ratios in a case of a predetermined signal transmission method)/10-bit, 12-bit signal having the number of pixels of one frame exceeding the number of pixels prescribed by an HD-SDI format, video data regions of to first to t-th (where t is an integer equal to or more than 8) sub-images prescribed by an m'×n' (m' and n' indicating m' samples and n' lines are positive integers)/a'−b' (a' and b' are frame rates of a progressive signal)/r':g':b' (r', g', and b' are signal ratios in a case of a predetermined signal transmission method)/10-bit, 12-bit signal;

sampling out the pixel samples every other line from each line of the first to t-th sub-images to which the pixel samples have been mapped, so as to generate an interlace signal;

sampling out for each word the pixel samples which have been sampled out for each line so as to be mapped to video data regions of the RD-SDI format of SMPTE (Society of Motion Picture and Television Engineers) 435-2; and outputting the HD-SDI format.

8. A signal reception apparatus comprising:

a writing control section that stores an HD-SDI format in a storage section;

a word multiplexing control section that performs word multiplexing for pixel samples extracted from video data regions of the HD-SDI format read out from the storage section, for each line;

a line multiplexing control section that multiplexes the pixel samples obtained by the word multiplexing into first to t-th (where t is an integer equal to or more than 8) sub-images prescribed by an m'×n' (m' and n' indicating m' samples and n' lines are positive integers)/a'−b' (a' and b' are frame rates of a progressive signal)/r':g':b' (r', g', and b' are signal ratios in a case of a predetermined signal transmission method)/10-bit, 12-bit signal, for each line, so as to generate a progressive signal; and a vertical rectangular region multiplexing control section that obtains t vertical rectangular regions by dividing, first and second class images into t (t=m/p) by p (where p is an integer equal to or more than 1) pixel samples in the horizontal direction, multiplexes pixel samples read out from each line of the video data regions of the first to t-th sub-images in the horizontal direction in a unit of p pixel samples into the first to t-th vertical rectangular regions from the 0th line to the (n−1)-th line of the first and second class images, reads out pixel samples from each line of the video data regions of the first to t-th sub-images in a unit of p pixel samples m'/p times and multiplexes the pixel samples, and repeatedly reads out and multiplexes pixel samples from the next line which is vertically subsequent to the line from which the pixel samples have been read out in the first and second class images, in a unit of p pixel samples, in a case of multiplexing pixel samples read out from the video data regions of the first to t-th sub images, into the consecutive first and second class images prescribed by an m×n (where m and n indicating m samples and n lines are positive integers)/a−b (where a and b are frame rates of a progressive signal)/r:g:b (where r, g, and b are signal ratios in a case of a predetermined signal transmission method)/10-bit, 12-bit signal having the number of pixels of one frame exceeding the number of pixels prescribed by the HD-SDI format.

9. The signal reception apparatus according to claim 8, wherein, in a case of the first and second class images where m×n is 3840×2160, a−b is 100P, 119.88P, 120P, and r:g:b is 4:4:4, 4:2:2, 4:2:0 in a UHDTV1 class image, the word multiplexing control section multiplexes the pixel samples extracted from video data regions of a 10.692 Gbps stream defined by four-channel mode D which is prescribed by SMPTE (Society of Motion Picture and Television Engineers) 435-2 and corresponds to each of the first to t-th sub-images, into lines; and the vertical rectangular region multiplexing control section maps the pixel samples extracted from video data regions of the first to t-th sub-images where m'×n' is 1920×1080, a'−b' is 50P, 59.94P, 60P, and r':g':b' is 4:4:4, 4:2:2, 4:2:0, to UHDTV1 class images.

10. The signal reception apparatus according to claim 9, further comprising a two-pixel multiplexing control section that multiplexes pixel samples extracted every two pixel samples for each line from the same line of a first UHDTV1 class image into lines every other line from the 0th line of a UHDTV2 class image and every two other pixel samples on the same line, multiplexes pixel samples extracted every two pixel samples for each line from the same line of a second UHDTV1 class image into lines every other line from the 0th line of the UHDTV2 class image and every two other pixel samples on the same line at positions different from those of the pixel samples multiplexed from the first UHDTV1 class image, multiplexes pixel samples extracted every two pixel samples for each line from the same line of a third UHDTV1 class image into lines every other line from the first line of the UHDTV2 class image and every two other pixel samples on the same line, and multiplexes pixel samples extracted every two pixel samples for each line from the same line of a fourth UHDTV1 class image into lines every other line from the first line of the UHDTV2 class image and every two other pixel samples on the same line at positions different from those of the pixel samples multiplexed from the third UHDTV1 class image, in a case of multiplexing pixel samples extracted from the first to fourth UHDTV1 class images into positions of two pixel samples adjacent to each other on the same line for each line of four consecutive lines of the UHDTV2 Class image which is prescribed by a 7680×4320/100P, 119.88P, 120P/4:4:4, 4:2:2, 4:2:0/10-bit, 12-bit signal and repeats the 0th to third lines.

11. The signal reception apparatus according to claim 8, wherein, in a case of first to N-th (where N is an integer equal to or more than 2) class images including the first and second class images where m×n is 3840×2160, a−b is (50P, 59.94P, 60P)×N, r:g:b is 4:4:4, 4:2:2, 4:2:0, and the number of lines of the class images is 0, 1, . . . , 2N−2, 2N−1, in a UHDTV1 class image, the word multiplexing control section performs word multiplexing for the pixel samples read out from video data regions of a 10.692 Gbps stream defined by four-channel mode D which is prescribed by SMPTE (Society of Motion Picture and Television Engineers) 435-2 and corresponds to each of the first to t-th sub-images; and the vertical rectangular region multiplexing control section maps the pixel samples read out from video data regions of the first to t-th sub-images where m'×n' is 1920×1080, a'−b' is 50P, 59.94P, 60P, r':g':b' is 4:4:4, 4:2:2, 4:2:0, t=4N, every n'/2N pixel samples, to the first to N-th class images.

12. The signal reception apparatus according to claim 11, further comprising a two-pixel multiplexing control section that multiplexes pixel samples extracted every two pixel samples for each line from the same line of a first UHDTV1 class image into lines every other line from the 0th line of a UHDTV2 class image and every two other pixel samples on the same line, multiplexes pixel samples extracted every two pixel samples for each line from the same line of the second UHDTV1 class image into lines every other line from the 0th line of the UHDTV2 class image and every two other pixel samples on the same line at positions different from those of the pixel samples multiplexed from the first UHDTV1 class image, multiplexes pixel samples extracted every two pixel samples for each line from the same line of a third UHDTV1 class image into lines every other line from the first line of the UHDTV2 class image and every two other pixel samples on the same line, and multiplexes pixel samples extracted every two pixel samples for each line from the same line of a fourth UHDTV1 class image into lines every other line from the first line of the UHDTV2 class image and every two other pixel samples on the same line at positions different from those of the pixel samples multiplexed from the third UHDTV1 class image, in a case of multiplexing pixel samples extracted from the first to N-th UHDTV1 class images into positions of two pixel samples adjacent to each other on the same line for each line of four consecutive lines of the UHDTV2 class image which is prescribed by a 7680×4320/(50P, 59.94P, 60P)×N/ 4:4:4, 4:2:2, 4:2:0/10-bit, 12-hit signal and repeats the 0th to third lines.

13. The signal reception apparatus according to claim 8, wherein, in a case where m×n is 4096×2160, a–b is (47.95P, 48P, 50P, 59.94P, 60P)×N (where N is an integer equal to or more than 2), r:g:b is 4:4:4, 4:2:2, and the first and second class images are 4096×2160 class images, the word multiplexing control section multiplexes the pixel samples extracted from video data regions of a 10.692 Gbps stream defined by six-channel mode B which is prescribed by SMPTE (Society of Motion Picture and Television Engineers) 435-2 and corresponds to each of the first to t-th sub-images, into lines; and the vertical rectangular region multiplexing control section maps the pixel samples extracted front video data regions of the first to t-th sub-images where m'×n' is 2048×1080, a'–b' is 47.95P, 48P, 50P, 59.94P, 60P, and r':g':b' is 4:4:4, 4:2:2, to 4096×2160 class images.

14. A signal reception method comprising:

storing an HD-SDI format in a storage section;

multiplexing for each word pixel samples extracted from video data regions of the HD-SDI format read out from the storage section;

multiplexing the pixel samples obtained by the word multiplexing into first to t-th (where t is an integer equal to or more than 8) sub-images prescribed by an m'×n' (m' and n' indicating m' samples and n' lines are positive integers)/a'–b' (a' and b' are frame rates of a progressive signal)/r':g':b' (r', g', and b' are signal ratios in a case of a predetermined signal transmission method)/10-bit, 12-bit signal, for each line, so as to generate a progressive signal; and obtaining t vertical rectangular regions by dividing first and second class images into t (t=m/p) by p (where p is an integer equal to or more than 1) pixel samples in the horizontal direction, multiplexing pixel samples read out from each line of the video data regions of the first to t-th sub-images in the horizontal direction in a unit of p pixel samples into the first to t-th vertical rectangular regions from the 0th line to the (n–1)-th line of the first and second class images, reading out pixel samples from each line of the video data regions of the first to t-th sub-images in a unit of p pixel samples m'/p times and multiplexing the pixel samples, and repeatedly reading out and multiplexes pixel samples from the next line which is vertically subsequent to the line from which the pixel samples have been read out in the first and second class images, in a unit of p pixel samples, in a case of multiplexing pixel samples read out from the video data regions of the first to t-th sub-images, into the consecutive first and second class images prescribed by an m×n (where m and n indicating in samples and n lines are positive integers)/a–b (where a and b are frame rates of a progressive signal)/r:g:b (where r, g, and b are signal ratios in a case of a predetermined signal transmission method)/10-bit, 12-bit signal having the number of pixels of one frame exceeding the number of pixels prescribed by the HD-SDI format.

15. A signal transmission system comprising:

a signal transmission apparatus; and a signal reception apparatus, wherein the signal transmission apparatus includes a vertical rectangular region sampling-out control section that obtains first to t-th vertical rectangular regions by dividing first and second class images into t by p (where p is an integer equal to or more than 1) pixel samples in the horizontal direction, repeatedly performs a process where pixel samples read out from each line of a 0th line to a (n–1)-th line of the first and second class images are mapped to each line of video data regions of first to t-th sub-images in a unit of p pixel samples in the horizontal direction for each of the first to t-th vertical rectangular regions, in an order of the first class image and the second class image, maps pixel samples to each line of the video data regions of the first to t-th sub-images in a unit of p pixel samples m'/p times, and repeatedly maps pixel samples to the next line which is vertically subsequent to the line to which the pixel samples have been mapped in a unit of p pixel samples, in a case of mapping pixel samples sampled out from the consecutive first and second class images prescribed by an m×n (where m and n indicating in samples and a lines are positive integers)/a–b (where a and b are frame rates of a progressive signal)/r:g:b (where r, g, and b are signal ratios in a case of a predetermined signal transmission method)/10-bit, 12-bit signal having the number of pixels of one frame exceeding the number of pixels prescribed by an HD-SDI format, to video data regions of first to t-th (where t is an integer equal to or more than 8) sub-images prescribed by a m'×n' (m' and n' indicating m' samples and n' lines are positive integers)/a'–b' (a' and b' are frame rates of a progressive signal)/r':g':b' (r', g', and b' are signal ratios in a case of a predetermined signal transmission method)/10-bit, 12-bit signal;

a line sampling-out control section that samples out the pixel samples every other line from each line of the first to t-th sub-images to which the pixel samples have been mapped, so as to generate an interlace signal;

a word sampling-out control section that samples out for each word the pixel samples which have been sampled out for each line so as to be mapped to video data regions of the HD-SDI format prescribed by SMPTE (Society of Motion Picture and Television Engineers) 435-2; and a readout control section that outputs the HD-SDI format, and wherein the signal reception apparatus includes a writing control section that stores an HD-SDI format in a storage section;

a word multiplexing control section that performs word multiplexing for pixel samples extracted from video data regions of the HD-SDI format read out from the storage section;

a line multiplexing control section that multiplexes the pixel samples which have been multiplexed for each word, into first to t-th sub-images, so as to generate a progressive signal; and a vertical rectangular region multiplexing control section that obtains t vertical rectangular regions by dividing first and second class images into t (t=m/p) by p (where p is an integer equal to or more than 1) pixel samples in the horizontal direction, multiplexes pixel samples read out from each line of the video data regions of the first to t-th sub-images in the horizontal direction in a unit of p pixel samples into the first to t-th vertical rectangular regions from the 0th line to the (n−1)-th line of the first and second class images, reads out pixel samples from each line of the video data regions of the first to t-th sub-images in a unit of p pixel samples $m'/p$ times and multiplexes the pixel samples, and repeatedly reads out and multiplexes pixel samples from the next line which is vertically subsequent to the line from which the pixel samples have been read out in the first and second class images, in a unit of p pixel samples, in a case of multiplexing pixel samples into the consecutive first and second class images.

* * * * *